United States Patent
Higashibara

(10) Patent No.: US 11,836,945 B2
(45) Date of Patent: Dec. 5, 2023

(54) IMAGE PROCESSING APPARATUS, IMAGE PROCESSING METHOD, AND PROGRAM

(71) Applicant: Sony Semiconductor Solutions Corporation, Kanagawa (JP)

(72) Inventor: Kiyoshi Higashibara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 289 days.

(21) Appl. No.: 17/293,400

(22) PCT Filed: Nov. 11, 2019

(86) PCT No.: PCT/JP2019/044181
§ 371 (c)(1),
(2) Date: May 12, 2021

(87) PCT Pub. No.: WO2020/105499
PCT Pub. Date: May 28, 2020

(65) Prior Publication Data
US 2022/0051435 A1    Feb. 17, 2022

(30) Foreign Application Priority Data

Nov. 20, 2018  (JP) .................... 2018-217023

(51) Int. Cl.
*G06T 7/70* (2017.01)
*G06T 7/73* (2017.01)
(Continued)

(52) U.S. Cl.
CPC .............. *G06T 7/74* (2017.01); *G06T 3/0018* (2013.01); *G06T 7/60* (2013.01); *G06T 2207/10032* (2013.01); *G06T 2207/30252* (2013.01)

(58) Field of Classification Search
CPC ........... G06T 7/74; G06T 3/0018; G06T 7/60; G06T 2207/10032; G06T 2207/30252;
(Continued)

(56) References Cited

U.S. PATENT DOCUMENTS

| 2010/0165104 A1 | 7/2010 | Fujita et al. |
| 2012/0075428 A1 | 3/2012 | Seki |

(Continued)

FOREIGN PATENT DOCUMENTS

| CN | 101410868 A | 4/2009 |
| JP | 2002-116008 A | 4/2002 |

(Continued)

OTHER PUBLICATIONS

International Search Report and English translation thereof dated Jan. 28, 2020 in connection with International Application No. PCT/JP2019/044181.

(Continued)

*Primary Examiner* — Qian Yang
(74) *Attorney, Agent, or Firm* — Wolf, Greenfield & Sacks, P.C.

(57) ABSTRACT

An accurate subject distance can be calculated on the basis of a camera captured image even in a case where the attachment angle of a camera is deviated. An image captured with a camera having a wide-angle lens is input to perform distortion correction and generate a corrected image. Moreover, the inclination of a vertical object in the real world in the corrected image is calculated. The deviation angle of the camera depression angle of the camera is calculated on the basis of the inclination of the vertical object. An object distance calculation image is generated in consideration of the camera depression angle deviation angle. The distance of an object included in the camera captured image is calculated from the object distance calculation image. In a case where the camera depression angle deviation angle is not equal to or less than a prespecified threshold, the object distance calculation image is generated by using overhead image generation mapping data in consideration of the camera depression angle deviation.

9 Claims, 12 Drawing Sheets

(51) Int. Cl.
  *G06T 3/00* (2006.01)
  *G06T 7/60* (2017.01)

(58) Field of Classification Search
  CPC .......... G06T 5/006; G06T 2207/30264; G06T 7/536; G01C 11/04; G01C 3/00; G01C 3/02; G01C 25/00; H04N 23/80; H04N 23/81; H04N 7/183; H04N 7/18; H04N 23/57; G08G 1/165
  See application file for complete search history.

(56) References Cited

U.S. PATENT DOCUMENTS

| | | | |
|---|---|---|---|
| 2018/0160776 A1* | 6/2018 | Hei | ........................ A43D 1/025 |
| 2018/0165833 A1 | 6/2018 | Inoue et al. | |
| 2019/0045122 A1 | 2/2019 | Chiaki | |

FOREIGN PATENT DOCUMENTS

| | | |
|---|---|---|
| JP | 5173551 B2 | 4/2013 |
| JP | 5923422 B2 | 5/2016 |
| WO | WO 2016/189878 A1 | 12/2016 |
| WO | WO 2017/179722 A1 | 10/2017 |
| WO | WO 2017/212927 A1 | 12/2017 |

OTHER PUBLICATIONS

International Written Opinion and English translation thereof dated Jan. 28, 2020 in connection with International Application No. PCT/JP2019/044181.

International Preliminary Report on Patentability and English translation thereof dated Jun. 3, 2021 in connection with International Application No. PCT/JP2019/044181.

Extended European Search Report dated Jan. 4, 2022 in connection with European Application No. 19886241.9.

* cited by examiner

FIG. 4
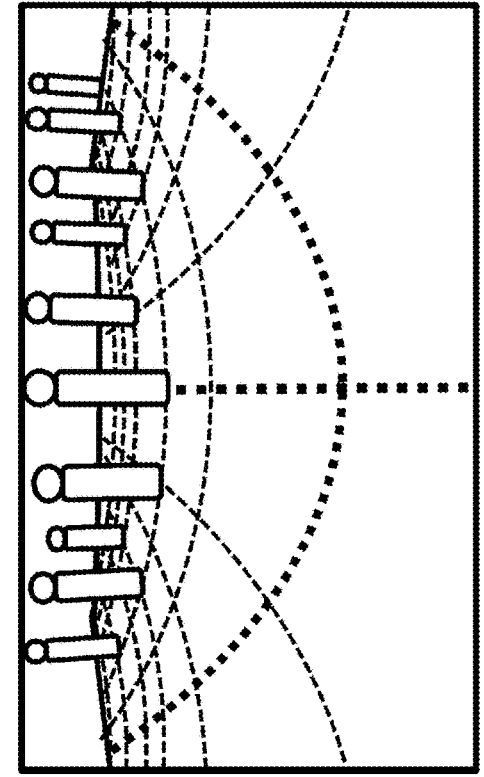
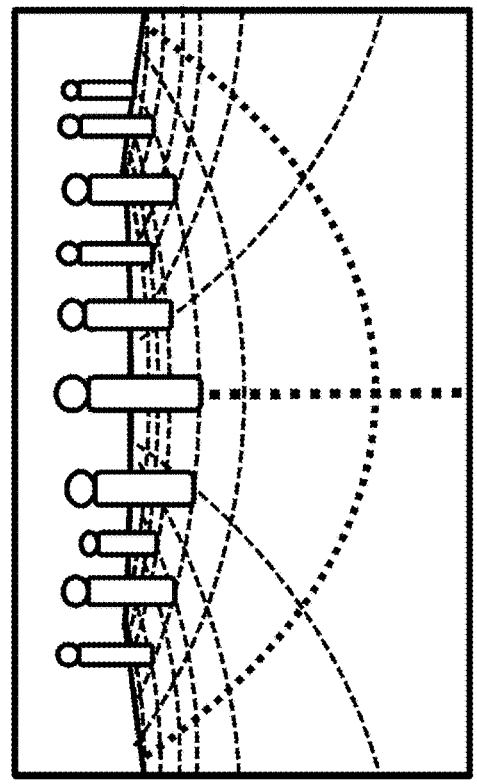
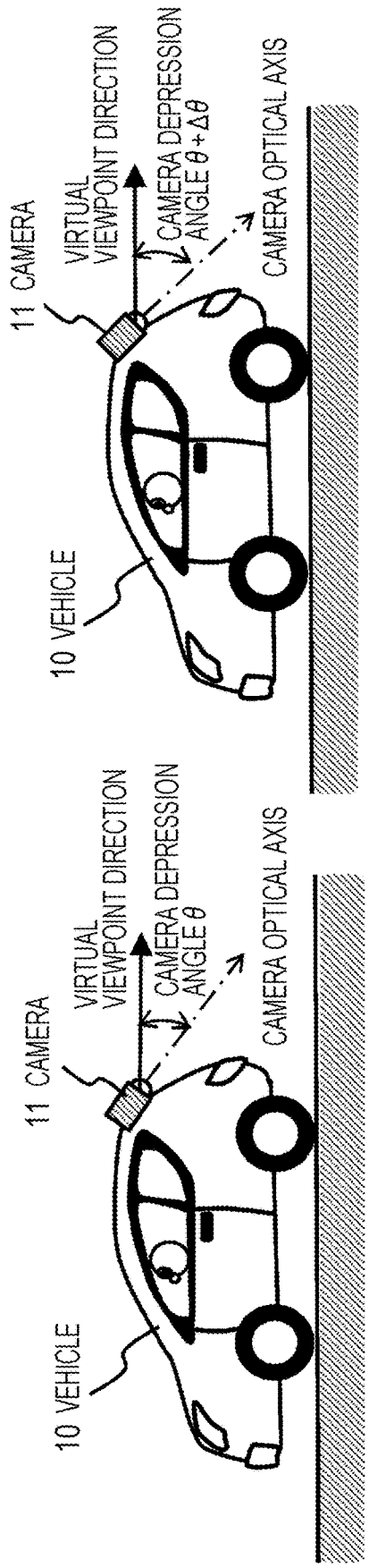
(a) CORRECTED IMAGE OF IMAGE CAPTURED WITH NORMALLY ATTACHED CAMERA
(b) CORRECTED IMAGE OF IMAGE CAPTURED WITH CAMERA WHOSE ATTACHMENT ANGLE DEVIATES ($\Delta\theta$)

IMAGE PROCESSING APPARATUS, IMAGE PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/044181, filed in the Japanese Patent Office as a Receiving Office on Nov. 11, 2019, which claims priority to Japanese Patent Application Number JP2018-217023, filed in the Japanese Patent Office on Nov. 20, 2018, each of which is hereby incorporated by reference in its entirety.

TECHNICAL FIELD

The present disclosure relates to an image processing apparatus, an image processing method, and a program. Specifically, for example, the present disclosure relates to an image processing apparatus, an image processing method, and a program for executing processing of calculating a subject distance from an image captured with a camera attached on a vehicle.

BACKGROUND ART

If a situation in a vehicle traveling direction such as a situation right in front of, on the side surface of, and in the rear of the vehicle cannot be visually recognized directly from a driver seat, the vehicle may have a risk of hitting an obstacle hidden in the traveling direction. A system for avoiding such a risk includes a camera system in which a camera is mounted on the front or rear part or side surface of a vehicle and a camera captured image is displayed on a monitor of the driver seat.

A problem in such a camera system includes an attachment error that occurs at the time of attaching a camera to a vehicle. The attachment error generates a deviation between an actual captured area of the camera and an original correct captured area in accordance with the attachment error.

An auxiliary line such as an indication line and a course prediction line may be superimposed and displayed on the monitor seen by a driver in a driver seat together with the camera captured image. A deviation of a captured area due to the camera attachment error causes the indication line and the course prediction line in the camera captured image to be displayed at a position deviated from the actual position.

Furthermore, in recent years, in-vehicle cameras have been used not only for a driver to perform monitoring with a monitor but for a vehicle system to detect an obstacle and a pedestrian. The vehicle system detects an obstacle and a pedestrian on the basis of a camera captured image, estimates a distance, and transmits the result to a unit on the side of the vehicle. The vehicle side performs controls of, for example, giving a warning notification to a driver and operating an automatic brake on the basis of the result.

In a case where such processing of a vehicle system, that is, a warning notification to a driver or the operation of an automatic brake is executed, accuracy of measuring the distance to an object is important.

The distance measurement value is influenced by a deviation of a camera attachment angle and a deviation of a posture of a vehicle from a design value. If a camera is not attached in accordance with a predetermined design without an error, a problem that an accurate distance cannot be measured occurs.

For example, a method using a captured image of a calibration chart is known as a method of detecting a camera attachment error.

In the method, a calibration chart is captured with a camera attached on a vehicle. A deviation between the captured image and an ideal image captured with a camera attached without an error is calculated. An attachment position and an angle of the camera are adjusted so as to reduce the deviation.

Alternatively, another method of detecting a camera attachment error has also been known. In the method, parallel lines and a chart going straight drawn on a road surface are captured with a camera, attached on a vehicle, facing a diagonally downward direction. Overhead conversion of converting the captured image into an image captured from directly above is performed. The states of the parallel lines and the chart going straight in the overhead conversion image are analyzed. Then, a camera attachment error is detected.

Note that, for example, Patent Document 1 (U.S. Pat. No. 5,173,551) and Patent Document 2 (U.S. Pat. No. 5,923,422) disclose these methods of correcting a camera attachment error as conventional techniques.

CITATION LIST

Patent Document

Patent Document 1: U.S. Pat. No. 5,173,551
Patent Document 2: U.S. Pat. No. 5,923,422

SUMMARY OF THE INVENTION

Problems to be Solved by the Invention

The above-described conventional techniques need preliminary preparation of a calibration chart in order to detect a camera attachment error. Furthermore, in a case where an attachment error is determined from parallel lines and the parallelism and straight performance of a grid in a captured image by using an overhead conversion image, preliminary preparation of an image conversion map for overhead conversion in accordance with the camera attachment state of a vehicle is necessary.

As described above, conventional methods of correcting a camera attachment error have a problem that preliminarily prepared data for correction, such as a calibration chart and an image conversion map, is necessary.

An object of the present disclosure is to provide an image processing apparatus, an image processing method, and a program capable of accurately calculating a subject distance without using such preliminarily prepared data even if there is a camera attachment error.

Solutions to Problems

A first aspect of the present disclosure is in an image processing apparatus including:
  a corrected image generation unit that performs distortion correction by inputting an image captured with a camera having a wide-angle lens and generates a corrected image;

a vertical object inclination calculation unit that calculates an inclination of a vertical object in a real world in the corrected image;

a camera depression angle deviation calculation unit that calculates a deviation angle of a camera depression angle of the camera on the basis of the inclination of the vertical object;

an object distance calculation image generation unit that generates an object distance calculation image in consideration of a camera depression angle deviation angle of the camera; and an object distance calculation unit that calculates a distance of an object included in the image captured with the camera with reference to the object distance calculation image.

Moreover, a second aspect of the present disclosure is in an image processing method executed in an image processing apparatus, including the steps of:

a corrected image generation unit performing distortion correction by inputting an image captured with a camera having a wide-angle lens and generating a corrected image;

a vertical object inclination calculation unit calculating an inclination of a vertical object in a real world in the corrected image;

a camera depression angle deviation calculation unit calculating a deviation angle of a camera depression angle of the camera on the basis of the inclination of the vertical object;

an object distance calculation image generation unit generating an object distance calculation image in consideration of a camera depression angle deviation angle of the camera; and an object distance calculation unit calculating a distance of an object included in the image captured with the camera with reference to the object distance calculation image.

Moreover, a third aspect of the present disclosure is in a program causing image processing to be executed in an image processing apparatus, the program causing:

a corrected image generation unit to perform distortion correction by inputting an image captured with a camera having a wide-angle lens and generate a corrected image;

a vertical object inclination calculation unit to calculate an inclination of a vertical object in a real world in the corrected image;

a camera depression angle deviation calculation unit to calculate a deviation angle of a camera depression angle of the camera on the basis of the inclination of the vertical object;

an object distance calculation image generation unit to generate an object distance calculation image in consideration of a camera depression angle deviation angle of the camera; and an object distance calculation unit to calculate a distance of an object included in the image captured with the camera with reference to the object distance calculation image.

Note that the program of the present disclosure can be provided by a storage medium or a communication medium that provides various program codes in a computer readable format to an information processing apparatus and a computer system capable of executing the various program codes, for example. Processing in accordance with a program is performed in an information processing apparatus and a computer system by providing such a program in a computer-readable format.

Other objects, features, and advantages of the present disclosure will be apparent from more detailed description based on the later-described embodiment of the present disclosure and the accompanying drawings. Note that a system in the specification has configuration of a logical set of a plurality of apparatuses. The system is not limited to a system in which apparatuses having each configuration are placed in the same housing.

Effects of the Invention

According to the configuration of one embodiment of the present disclosure, an accurate subject distance can be calculated on the basis of a camera captured image even in a case where a camera attachment angle is deviated.

Specifically, for example, an image captured with a camera having a wide-angle lens is input to perform distortion correction and generate a corrected image. Moreover, the inclination of a vertical object in the real world in the corrected image is calculated. The deviation angle of the camera depression angle of the camera is calculated on the basis of the inclination of the vertical object. An object distance calculation image is generated in consideration of the camera depression angle deviation angle. The distance of an object included in the camera captured image is calculated from the object distance calculation image. In a case where the camera depression angle deviation angle is not equal to or less than a prespecified threshold, the object distance calculation image is generated by using overhead image generation mapping data in consideration of the camera depression angle deviation.

The configurations allow calculation of an accurate subject distance based on a camera captured image even in a case where the camera attachment angle is deviated.

Note that the effects described in the specification are merely illustration and not limitation, and additional effects may be exhibited.

BRIEF DESCRIPTION OF DRAWINGS

FIG. 4 illustrates a corrected image of an image captured with a normally attached camera and a corrected image of an image captured with a camera with a deviated attachment angle.

MODE FOR CARRYING OUT THE INVENTION

Details of an image processing apparatus, an image processing method, and a program of the present disclosure will be described below with reference to the drawings. Note that the description will be given in accordance with the following items.

1. Outline of Conversion Processing of Camera Captured Image
2. Processing Executed by Image Processing Apparatus of Present Disclosure
2-(1) Processing of Calculating Deviation Angle (Δθ) of Camera Depression Angle
2-(2) Processing of Calculating Subject Distance (Object Distance) in Consideration of Deviation Angle (Δθ) of Camera Depression Angle
2-(2)-(A) Example of Processing of Calculating Object Distance by Using Image Captured with Camera with Normal Camera Depression Angle (θ)
2-(2)-(B1) Example of Processing of Calculating Object Distance by Using Image Captured with Camera with Camera Depression Angle (θ+Δθ) with Attachment Error (Example of Inaccurate Distance Calculation)
2-(2)-(B2) Example of Processing of Calculating Object Distance by Using Image Captured with Camera with Camera Depression Angle (θ+Δθ) with Attachment Error (Example of Accurate Distance Calculation)
3. Configuration of Image Processing Apparatus of Present Disclosure and Image Processing Sequence
4. Hardware Configuration Example of Image Processing Apparatus of Present Disclosure
5. Summary of Configuration of Present Disclosure

[1. Outline of Conversion Processing of Camera Captured Image]

Figure 1:
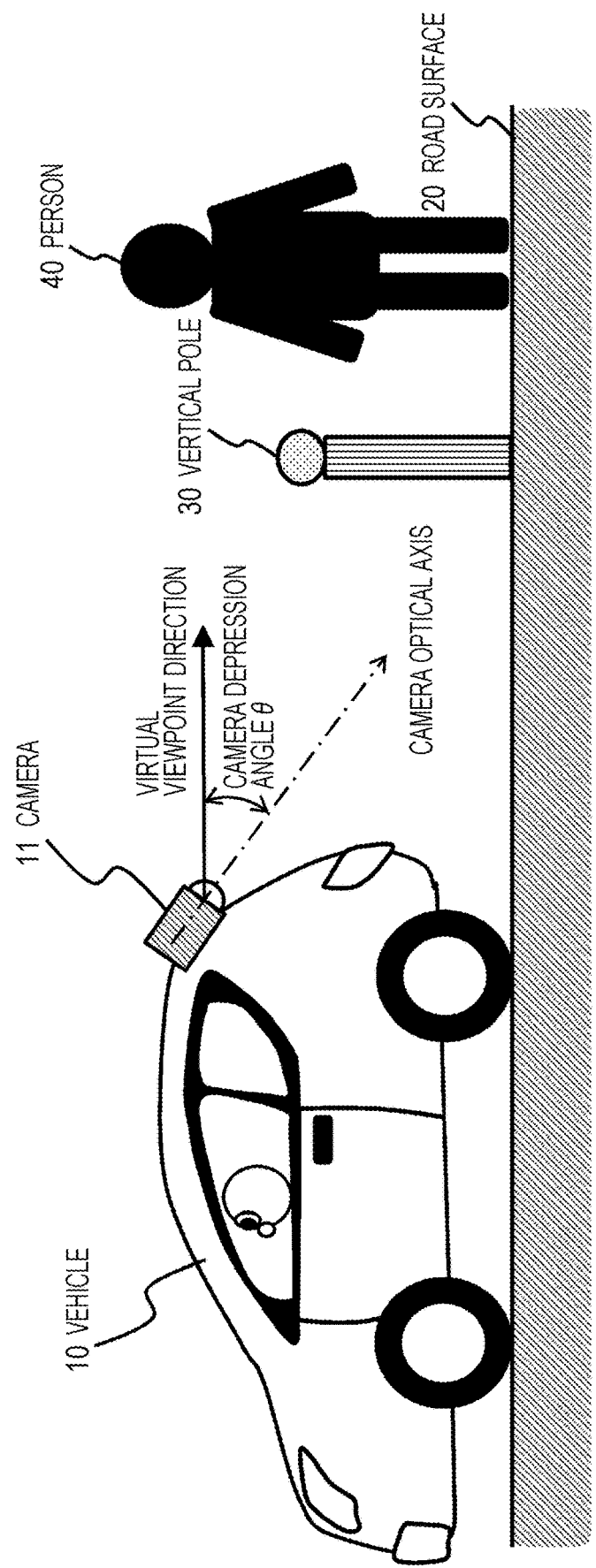
FIG. 1 illustrates a configuration example of a vehicle mounted with an image processing apparatus of the present disclosure.

First, conversion processing of a camera captured image will be outlined with reference to FIG. 1 and the subsequent figures.

FIG. 1 illustrates a vehicle 10 mounted with an image processing apparatus of the present disclosure. A camera 11 is mounted on the vehicle 10.

The camera 11 captures an image of the rear of the vehicle 10.

The camera 11 is a wide-angle lens camera including a wide-angle lens such as a fisheye lens, and can capture an image of a wide area behind the vehicle.

In the example in the figure, the camera 11 captures an image a vertical pole 30 or a person 40 on a road surface 20 behind the vehicle 10. The captured image is input to the image processing apparatus in the vehicle 10. Image correction processing is executed in the image processing apparatus. A corrected image similar to an image as seen with naked eyes is displayed on a monitor in a driver seat.

Furthermore, the image processing apparatus calculates the distance (object distance) from the vehicle 10 to the vertical pole 30 or the person 40 on the basis of the captured image. For example, in a case where the object distance comes to be equal to or less than a prespecified threshold, a warning notification is given to a driver.

As illustrated in the figure, since the camera 11 covers the vicinity of the rear of the vehicle 10 as an image capturing range, a camera optical axis is directed slightly downward.

Not an image in the camera-optical-axis direction, that is, the image capturing direction of the camera 11 just as it is but an image obtained by converting an image captured with the camera 11 into an image in a direction of the rear of the vehicle parallel to the road surface 20 is displayed on the monitor of the driver seat. The viewpoint direction of a monitor display image is defined as a virtual viewpoint direction.

Assuming that the virtual viewpoint direction is defined as the direction of the rear of the vehicle parallel to the road surface 20, an angle formed by the virtual viewpoint direction and the camera optical axis corresponds to a camera depression angle, which indicates the inclination of the camera.

Note that, as described above, the camera 11 is a wide-angle lens camera including a wide-angle lens such as a fisheye lens, and can capture an image of a wide area behind the vehicle.

Note, however, that an image captured with a wide-angle lens has distortion.

A specific example of the distortion will be described with reference to FIG. 2 and the subsequent figures.

Figure 2:
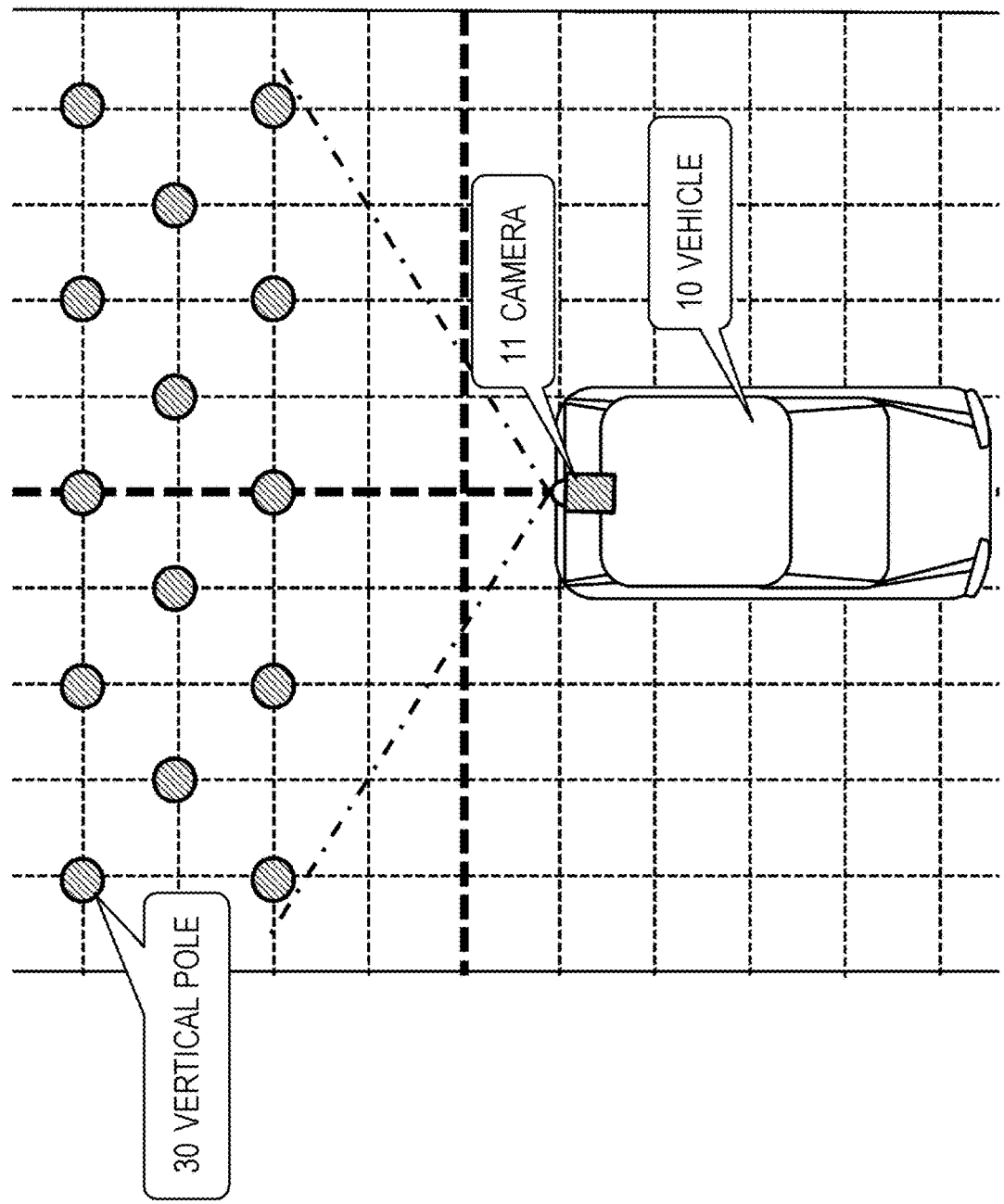
FIG. 2 illustrates a capturing environment example for describing distortion of an image captured with a wide-angle lens.

As illustrated in FIG. 2, the camera 11 captures an image of a state in which a large number of vertical poles 30 stand behind the vehicle 10 on a road surface with grid lines. The vertical poles 30 are similar to the vertical pole 30 in FIG. 1, and vertically stand on the road surface 20.

The camera 11 including a wide-angle lens captures an image of the rear of the vehicle 10, in which the large number of vertical poles 30 stand.

Figure 3:
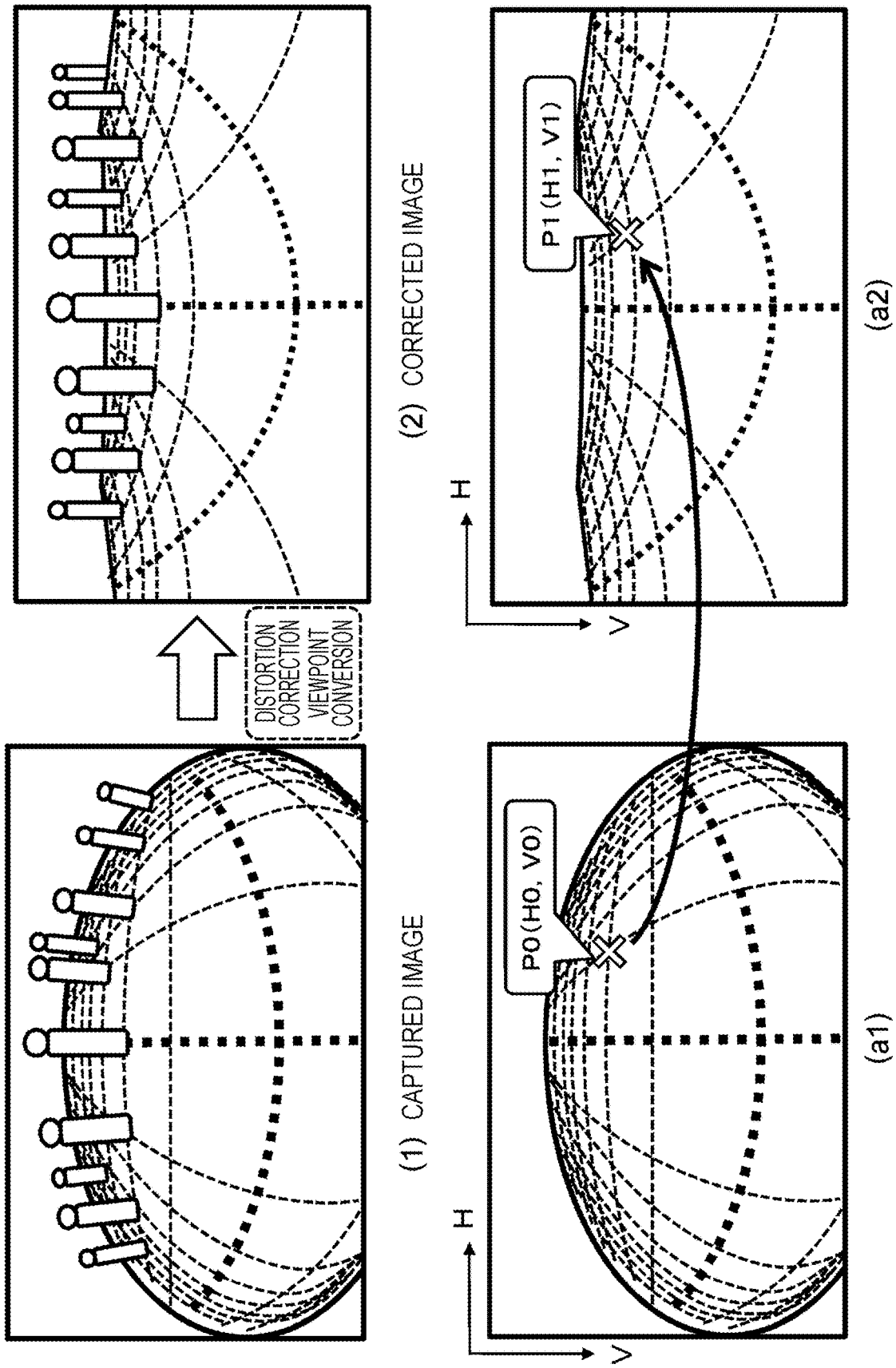
FIG. 3 illustrates a corrected image generated by correcting the image captured with a wide-angle lens and the correspondence relation between pixel positions in images.

FIG. 3(1) is a captured image. As illustrated in FIG. 3(1), the grid pattern of a road surface in the captured image has curved distortion. Furthermore, a vertical pole 30 appears to be inclined as the vertical pole 30 approaches the periphery of the image.

The distortion is caused by capturing an image with a wide-angle lens.

FIG. 3(2) is a corrected image generated by performing distortion correction and viewpoint conversion on the image of FIG. 3(1).

In the example, the corrected image is illustrated. The corrected image is obtained by performing the distortion correction and the viewpoint conversion. The distortion correction is performed so that the vertical poles 30 stand vertically. The viewpoint conversion is performed so that the viewpoint direction corresponds to the direction parallel to the road surface, that is, the virtual viewpoint direction in FIG. 1. The corrected image is displayed on the monitor in the driver seat.

The image conversion processing of converting the FIG. 3(1) captured image into the FIG. 3(2) corrected image is performed by, for example, distortion correction, in which cylindrical projection is performed, and image conversion processing on the basis of the camera depression angle and camera lens distortion information.

An example of mapping processing in image conversion, that is, pixel position mapping processing executed at the time when the FIG. 3(1) captured image is converted into the FIG. 3(2) corrected image will be described with reference to FIGS. 3(a1) and 3(a2).

FIG. 3(a1) is an image before image conversion. Which position (pixel position) (H, V) on the image any point in three-dimensional space, for example, any point (x, y, z) in world coordinates is placed at can be uniquely determined on the basis of a camera position (X, Y, Z), an optical axis orientation (yaw, pitch, roll), lens distortion data, and sensor size information.

FIG. 3(a2) is an example of an image after the image of FIG. 3(a1) is converted. The image in FIG. 3(a2) is generated by performing viewpoint conversion so that the direction parallel to the road surface, that is, the virtual viewpoint direction in FIG. 1 is adopted, and performing image conversion of cylindrically projecting the captured image.

The image conversion can be executed by using mapping data (corrected image generation mapping data), which is corresponding pixel position registration data obtained by registering a pixel position P1 (H1, V1) of an image after conversion (corrected image) corresponding to a pixel position P0 (H0, V0) of an image before conversion (captured image).

Note that, in each image, each pixel position is expressed by coordinates (H. V), where the upper left end of the image is defined as (H, V)=(0, 0), the horizontal right direction is defined as an H axis, and the vertical downward direction is defined as a V axis.

Using mapping data allows the pixel position P1 (H1, V1) on the image after conversion to be calculated from the pixel position P0 (H0, V0) on the image before conversion.

Furthermore, in reverse, the pixel position P0 (H0, V0) on the image before conversion can be calculated from the pixel position P1 (H1, V1) on the image after conversion.

Moreover, using the later-described object distance calculation image (overhead image) allows a position of three-dimensional space in the real world, that is, a position (x, y, z) in the world coordinates or the object distance (distance from a camera (vehicle) to an object (subject)) to be calculated.

In this way, using the corrected image generation mapping data, which is correspondence data of a pixel position before conversion of an image and a pixel position after conversion of the image, allows an image captured with a wide-angle lens to be converted into a usual camera captured image (corrected image (converted image)) seen from a predetermined viewpoint direction (virtual viewpoint direction in FIG. 1).

Only in a case where the camera 11 is installed at a normal attachment position and a normal attachment angle, however, a normal corrected image can be obtained by using the corrected image generation mapping data. For example, in a case where the camera 11 is not installed at a normal attachment angle, conversion to a usual camera captured image seen from a predetermined viewpoint direction (virtual viewpoint direction in FIG. 1) cannot be performed even if pixel position conversion using preliminarily generated mapping data is performed.

FIG. 4 illustrates, side by side, a corrected image of an image captured with a normally attached camera and a corrected image of an image captured with a camera with a deviated attachment angle.

Here, (a) is a corrected image of an image captured with a normally attached camera, and (b) is a corrected image of an image captured with a camera with a deviated attachment angle.

In (a), the camera 11 is attached at a preset normal camera depression angle (angle formed by the virtual viewpoint direction and the optical axis). That is, attachment is performed such that the camera depression angle=θ is established.

In contrast, the camera depression angle=θ+Δθ is established in the camera 11 of (b). The camera depression angle deviates from the specified angle (θ) by Δθ. That is, the camera optical axis is set below the normal attachment angle by Δθ.

If the attachment angle of the camera 11 deviates in this way, the display positions of the same body on images are different from each other, which results in change of an object display position and a display aspect in a corrected image generated by using the same corrected image generation mapping data.

As can be understood by comparing the two corrected images (a) and (b) in FIG. 4, vertical poles are vertically displayed on the corrected image in (a), whereas the vertical poles are displayed with an inclination as the vertical poles separate from the center of the image to the right and left in (b).

This is caused by image conversion using the same corrected image generation mapping data. That is, this is caused by using one piece of corrected image generation mapping data for converting an image captured with a camera with a normal attachment angle.

[2. Processing Executed by Image Processing Apparatus of Present Disclosure]

Next, processing executed by the image processing apparatus of the present disclosure will be described with reference to FIG. 5 and subsequent figures.

The image processing apparatus of the present disclosure allows calculation of an accurate distance to a subject (object distance) even if an image is captured with a camera with an abnormal attachment angle.

As described above with reference to FIG. 4, the vertical poles are displayed with an inclination as the vertical poles separate from the center of the image to the right and left in the corrected image of an image captured with a camera with a deviated attachment angle, that is, the corrected image in FIG. 4(b).

The image processing apparatus of the present disclosure detects an inclination (α) in a corrected image of an object vertical to the road surface, and calculates a deviation angle (Δθ) of the camera depression angle on the basis of the inclination (α).

Moreover, an object distance calculation image (overhead image) for calculating a subject position and a subject distance is generated in consideration of the calculated deviation angle (Δθ) of the camera depression angle. The subject distance (object distance) is calculated by using the generated object distance calculation image (overhead image).

The processing allows calculation of a correct subject distance even from an image captured with a camera attached with a deviation from a specified camera depression angle (θ).

Hereinafter, a specific example of the processing executed by the image processing apparatus of the present disclosure will be described in the order of the following items.

(1) Processing of Calculating Deviation Angle (Δθ) of Camera Depression Angle (2) Processing of Calculating Subject Distance (Object Distance) in Consideration of Deviation Angle (Δθ) of Camera Depression Angle

[2-(1) Processing of Calculating Deviation Angle (Δθ) of Camera Depression Angle]

First, processing of calculating a deviation angle (Δθ) of a camera depression angle will be described.

An inclination generated in a corrected image of an image captured with a camera with a deviated attachment angle (camera depression angle (θ)), that is, the inclination of a vertical object such as the vertical pole 30 vertically standing on a road surface in the real world will be described with reference to FIG. 5.

As described above with reference to FIG. 4, if an image captured with a camera with the camera depression angle=θ+Δθ, which is not the specified angle (θ), is converted by using mapping data for an image captured with a camera with the camera depression angle=θ, the converted image (corrected image) is not a right corrected image as seen from the scheduled viewpoint direction (virtual viewpoint direction in FIG. 1).

For example, a vertical object in the real world is displayed in an inclined manner as the vertical object separates from the center position of an image in the right-and-left direction to the right and left.

Figure 5:
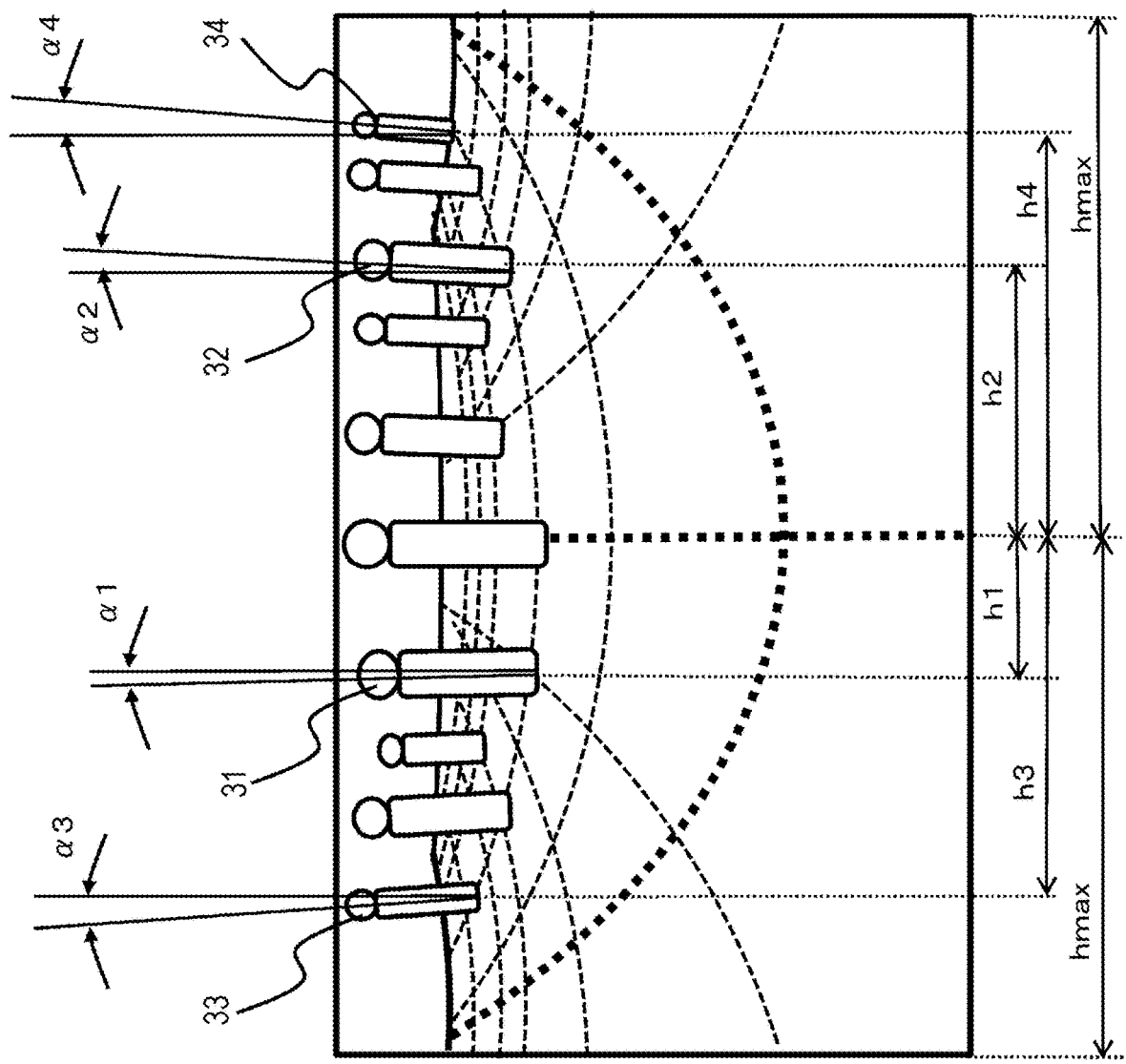
FIG. 5 illustrates processing executed by the image processing apparatus of the present disclosure.

For example, in the example in FIG. 5, distances (h1 to h4) from the center position of the image in the right-and-left direction and inclinations (α1 to α4) of four vertical poles 31 to 34 have the following relation.

The distances (h1 to h4) of the four vertical poles 31 to 34 from the center position of the image in the right-and-left direction have the following relation.

$$h1<h2<h3<h4$$

In the case, the inclinations (α1 to α4) of the four vertical poles 31 to 34 have the following relation.

$$α1<α2<α3<α4$$

In the way, a vertical object vertically standing on a road surface in the real world has an inclination that increases as the vertical object separates from the center position of the corrected image in the right-and-left direction to the right and left.

Figure 6:
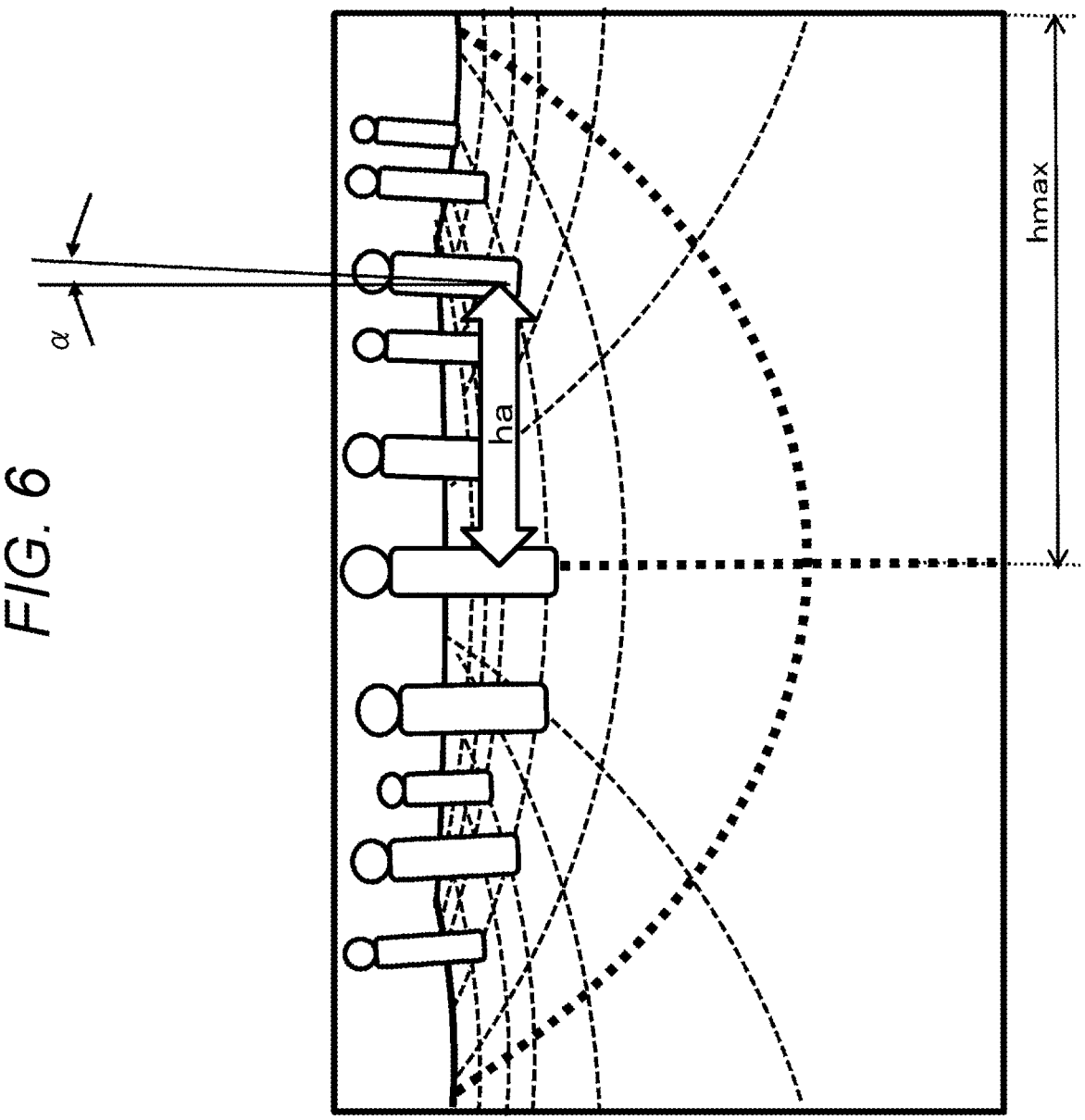
FIG. 6 illustrates the processing executed by the image processing apparatus of the present disclosure.

As illustrated in FIG. 6, the ratio (α/ha) of the distance=ha from the center position of the corrected image in the right-and-left direction to an inclination α of the vertical object is indicated by (Expression 1) below.

$$α/ha=α\ max/h\ max \qquad \text{(Expression 1)}$$

In (Expression 1) above, h max represents a distance from the center position of the corrected image in the right-and-left direction to a right or left image end, and α max represents an inclination of the vertical object in the real world at the right and left image ends.

In this way, in a case where an image captured with a camera with a camera depression angle deviation (Δθ) of the camera depression angle=θ+Δθ is converted by using corrected image generation mapping data for a camera with a normal attachment angle of the camera depression angle=θ, the vertical object comes to have an inclination (α) in accordance with the camera depression angle deviation (Δθ).

In a case where the aspect ratio (vertical/horizontal) of a corrected image generated by the conversion processing is defined as A, the relation between the camera depression angle deviation (Δθ), the aspect ratio (vertical/horizontal) A of the corrected image, and the inclination α max of a vertical object in the real world at a right or left image end of the corrected image is indicated by (Expression 2) below.

$$Δθ=A Δα\ max \qquad \text{(Expression 2)}$$

The following relational expression of (Expression 3) can be obtained on the basis of (Expression 2) above and (Expression 1) described above.

$$Δθ=A×α Δh\ max/ha \qquad \text{(Expression 3)}$$

As illustrated in (Expression 3) above, the camera depression angle deviation (Δθ) can be calculated by using the values of the aspect ratio (vertical/horizontal) A of a corrected image, a distance h max from the center position of the corrected image in the right-and-left direction to a right or left image end, and the inclination α of a vertical object an optional distance ha away from the center position of the corrected image in the right-and-left direction.

In this way, if an object vertically standing on a road surface of a captured area of a camera, for example, a pole, a sign, and a person can be detected, the distance ha from the center position of the corrected image in the right-and-left direction to the object and the inclination α of the object can be determined from the image, and the camera depression angle deviation (Δθ) can be calculated by using (Expression 3) above.

Note that, in a case where a plurality of (n) vertical objects is detected in a camera captured image, and individual inclinations (α1 to αn) are detected for the vertical objects (1 to n), processing of calculating n camera depression angle deviations (Δθ1 to Δθn) in accordance with (Expression 3) above on the basis of the inclinations (α1 to αn) for separate objects, calculating the average or the intermediate value of the n calculated value, and defining the calculated value as the camera depression angle deviation (Δθ) may be performed.

[2-(2) Processing of Calculating Subject Distance (Object Distance) in Consideration of Deviation Angle (Δθ) of Camera Depression Angle]

Next, processing of calculating a subject distance (object distance) in consideration of a deviation angle (Δθ) of a camera depression angle will be described.

The following three types of processing examples will be described as specific examples of processing of calculating a subject distance (object distance).

(A) Example of Processing of Calculating Object Distance by Using Image Captured with Camera with Normal Camera Depression Angle (θ)

(B1) Example of Processing of Calculating Object Distance by Using Image Captured with Camera with Camera Depression Angle (θ+Δθ) with Attachment Error (Example of Inaccurate Distance Calculation)

(B2) Example of Processing of Calculating Object Distance by Using Image Captured with Camera with Camera Depression Angle (θ+Δθ) with Attachment Error (Example of Accurate Distance Calculation)

Note that the image processing apparatus of the present disclosure executes the above-described processing of (A) and (B2). That is, both in a case where a camera is attached at the normal camera depression angle (θ) and in a case where the camera is attached at the camera depression angle (θ+Δθ) with an attachment error, the subject distance can be correctly calculated.

(2-(2)-(A) Example of Processing of Calculating Object Distance by Using Image Captured with Camera with Normal Camera Depression Angle (θ))

First, an example of processing of calculating an object distance by using an image captured with a camera with the normal camera depression angle (θ) will be described with reference to FIG. 7.

That is, an example of processing of calculating an object distance by using a corrected image will be described. The corrected image is generated by processing of converting an image captured with a normally attached camera.

Figure 7:
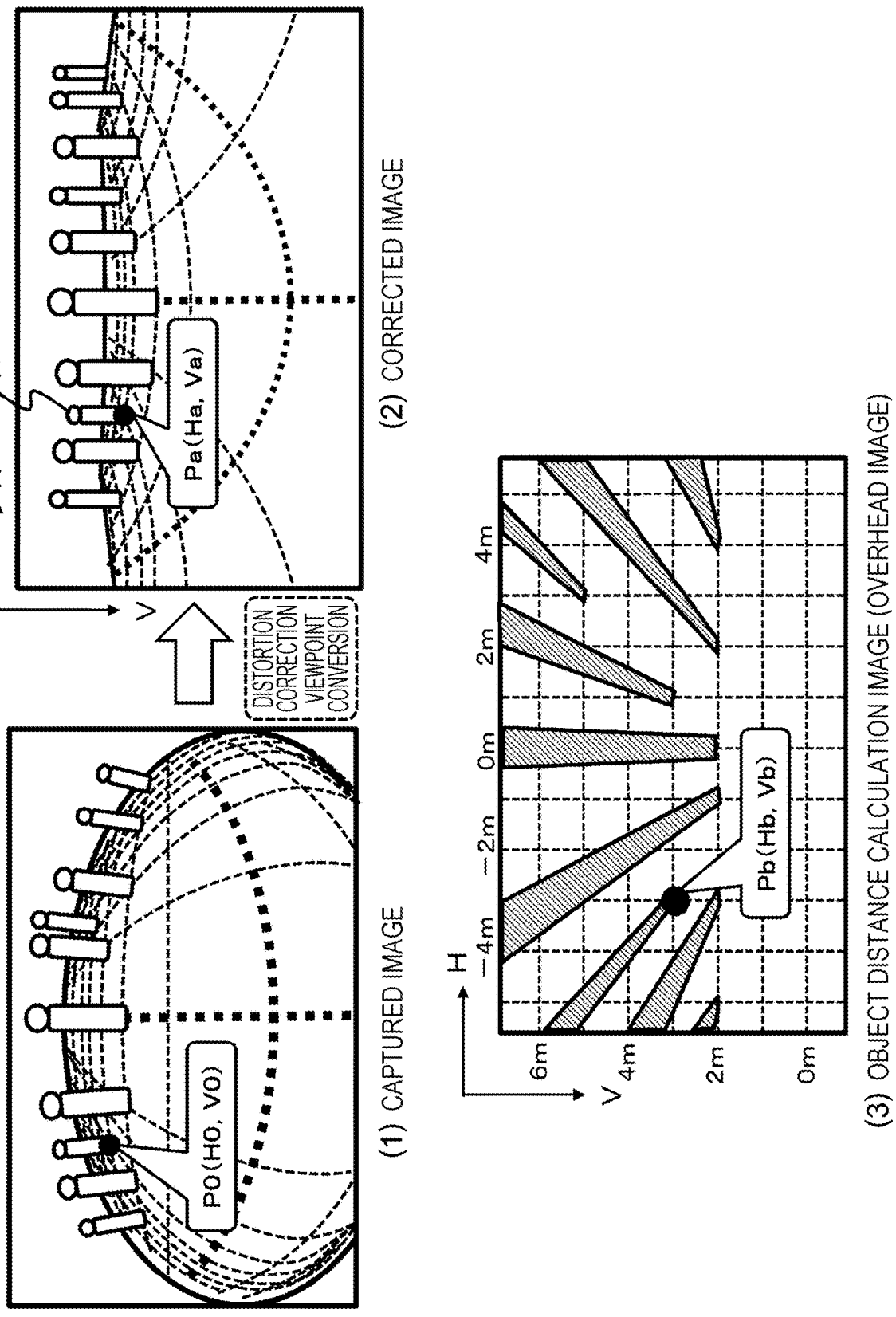
FIG. 7 illustrates an example of processing of calculating an object distance by using an image captured with a camera with a normal camera depression angle ($\theta$).

Here, (1) captured image in FIG. 7 is obtained by a camera attached so as to have a preset normal camera depression angle (angle formed by virtual viewpoint direction and optical axis), that is, the camera depression angle=θ.

In contrast to the captured image of (1), a (2) corrected image is generated by using the above-described corrected image generation mapping data, that is, corrected image generation mapping data, which has been generated for converting an image captured with a camera attached at a normal attachment angle.

The corrected image is obtained by conversion into a normal camera captured image (corrected image (converted image)) seen from a predetermined viewpoint direction (virtual viewpoint direction in FIG. 1).

FIG. 7(3) is an object distance calculation image. FIG. 7(3) is an overhead image observed from a position further above the attachment position of the camera 11 of the vehicle 10 in FIG. 1 to the diagonally downward direction in the rear of the vehicle. In contrast to the captured image of FIG. 7(1), the overhead image can be generated by using mapping data for generating an overhead image, that is, overhead image generation mapping data, which has been generated for converting an image captured with a camera attached at a normal attachment angle.

The object distance is calculated by using these three images. Here, an example of calculating the distance to one vertical pole 81 in the FIG. 7(2) corrected image will be described.

The pixel position of the intersection of one vertical pole 81 and a road surface in the FIG. 7(2) corrected image, that is, the pixel position in the corrected image is defined as (Ha, Va).

The coordinates (H0, V0) indicating a corresponding pixel position in the captured image can be determined with reference to the corrected image generation mapping data. The mapping data is a map in which corresponding pixel positions of the captured image in FIG. 7(1) and the corrected image in FIG. 7(2) are registered.

Moreover, a corresponding pixel position (Hb, Vb) of the object distance calculation image (overhead image) in FIG. 7(3) of the coordinates (H0, V0) indicating a pixel position in the captured image can be obtained with reference to overhead image generation mapping data. The mapping data is a map in which corresponding pixel positions of the captured image in FIG. 7(1) and the object distance calculation image (overhead image) in FIG. 7(3) are registered.

The corresponding pixel position (Hb, Vb) of the object distance calculation image (overhead image) is the pixel position of the intersection of one vertical pole 81 and the road surface in the FIG. 7(2) corrected image, that is, the corresponding pixel position of the pixel position (Ha, Va) in the corrected image.

The object distance calculation image (overhead image) in FIG. 7(3) is a converted image obtained by equally scaling the road surface, that is, an overhead image reflecting positions in the real world, so that coordinates indicating a position in the real world can be determined from the pixel position (Hb, Vb) of the object distance calculation image (overhead image). In the example, the intersection of the vertical pole 81 and the road surface is located at the position of 3 m to the left side and 3 m to the depth side from the camera.

Assuming that the camera 11 is located at the central position of the rear surface of the vehicle 10, it can be analyzed that the vertical pole 81 is an object vertically standing at the position of 3 m behind the vehicle and 3 m left from the center of the vehicle width.

(2-(2)-(B1) Example of Processing of Calculating Object Distance by Using Image Captured with Camera with Camera Depression Angle ($\theta+\Delta\theta$) with Attachment Error [(Example of Inaccurate Distance Calculation)]

Next, an example of processing of calculating an object distance by using an image captured with a camera with a camera depression angle ($\theta+\Delta\theta$) with an attachment error (example of inaccurate distance calculation) will be described.

Note that the image processing apparatus of the present disclosure does not execute the processing. Prior to description of processing executed by the image processing apparatus of the present disclosure, an example in which an accurate distance cannot be calculated in processing of calculating an object distance by using an image captured with a camera with the camera depression angle ($\theta+\Delta\theta$) with an attachment error will be described.

In the example of object distance analysis processing described with reference to FIG. 7, an image captured with a camera correctly attached at a prespecified camera depression angle=$\theta$ is used.

An example in which a correct distance cannot be calculated will be described with reference to FIG. 8. In the example, a camera is not correctly attached at the prespecified camera depression angle=$\theta$, that is, the object distance is calculated by using an image captured with a camera attached with a camera depression angle deviation ($\Delta\theta$).

Figure 8:
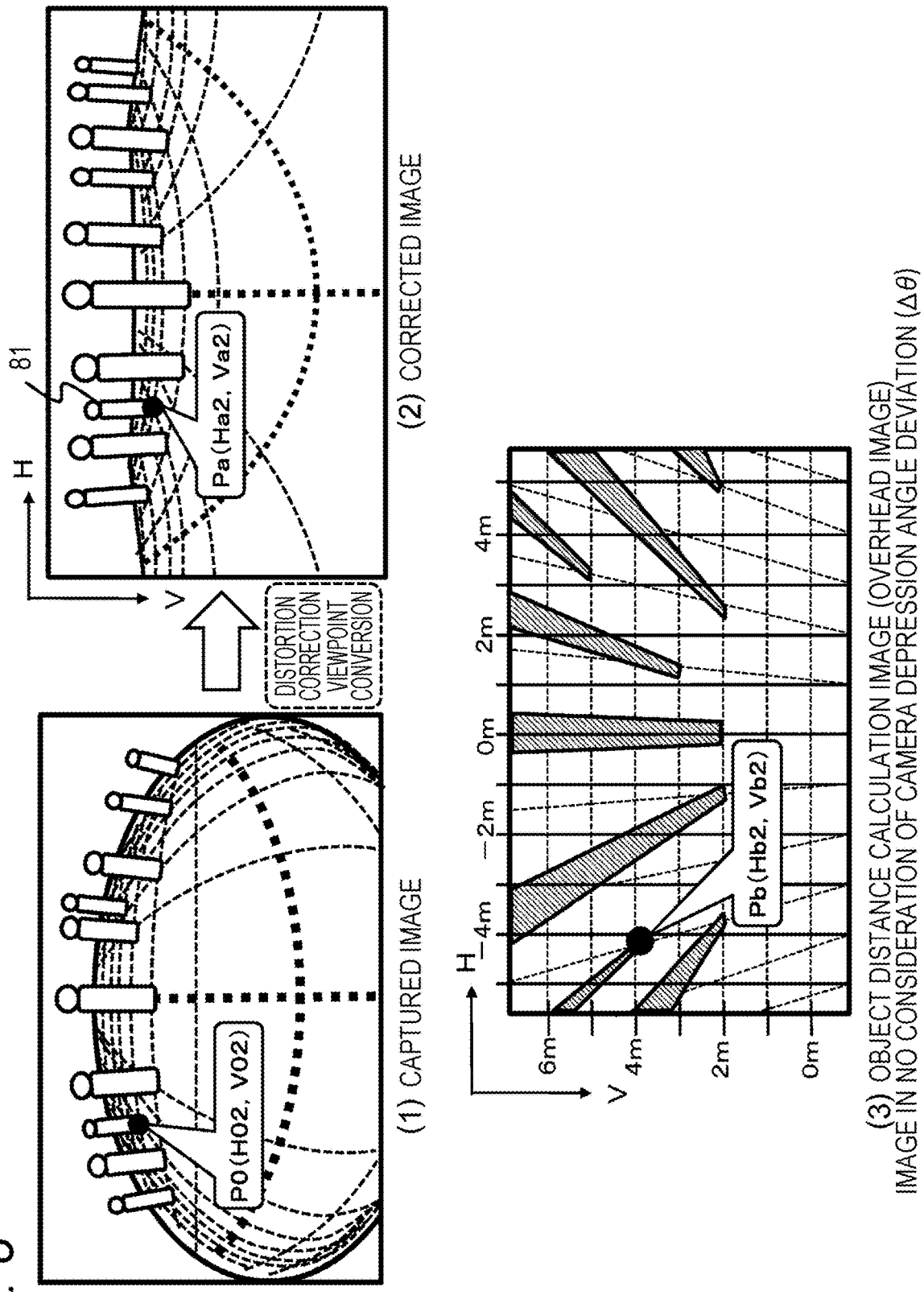
FIG. 8 illustrates an example of calculating an erroneous object distance by using an image captured with a camera attached with a camera depression angle deviation ($\Delta\theta$).

Here, a (1) captured image in FIG. 8 is obtained by a camera attached with a camera depression angle deviation ($\Delta\theta$), which is different from a preset normal camera depression angle (angle formed by a virtual viewpoint direction and an optical axis), that is, the camera depression angle=$\theta$, that is a camera with the camera depression angle=$\theta+\Delta\theta$.

In contrast to the captured image of (1), a FIG. 8(2) corrected image is generated by using the above-described corrected image generation mapping data, that is, corrected image generation mapping data, which has been generated for converting an image captured with a camera attached at a normal attachment angle.

The corrected image is obtained by conversion into a normal camera captured image (corrected image (converted image)) seen from a predetermined viewpoint direction (virtual viewpoint direction in FIG. 1).

The captured image of FIG. 8(1) is captured with a camera having the camera depression angle deviation ($\Delta\theta$), which is different from the normal camera depression angle=$\theta$, that is, the camera depression angle=$\theta+\Delta\theta$. Consequently, if the corrected image generation mapping data for an image captured with a camera with a normal attachment angle is used, correct conversion is not performed. As a result, vertical poles in the FIG. 8(2) corrected image are displayed such that the inclinations increase as the vertical poles separate from the center of the image in the right-and-left direction to right-and-left directions of the image.

FIG. 8(3) is an object distance calculation image. FIG. 8(3) is an overhead image observed from a position further above the attachment position of the camera 11 of the vehicle 10 in FIG. 1 to the diagonally downward direction in the rear of the vehicle. The overhead image is also generated by using overhead image generation mapping data for generating an overhead image from an image captured with a camera attached at the normal attachment angle (camera depression angle=$\theta$).

That is, in the overhead image in FIG. 8(3), the deviation ($\Delta\theta$) of the camera depression angle is not considered.

If the object distance is calculated by using the three images, the correct object distance cannot be calculated.

In a manner similar to that in FIG. 7, an example of calculating a distance to one vertical pole 81 in the FIG. 8(2) corrected image will be described.

The pixel position of the intersection of one vertical pole 81 and a road surface in the FIG. 8(2) corrected image, that is, the pixel position in the corrected image is defined as (Ha2, Va2).

Coordinates (H02, V02) indicating the corresponding pixel position in the captured image can be determined with reference to the corrected image generation mapping data.

Moreover, a corresponding pixel position (Hb2, Vb2) of the object distance calculation image (overhead image) in FIG. 8(3) of the coordinates (H02, V02) indicating a pixel position in the captured image can be obtained with reference to overhead image generation mapping data. The mapping data is a map in which corresponding pixel positions of the captured image in FIG. 8(1) and the object distance calculation image (overhead image) in FIG. 8(3) are registered.

Note, however, that the overhead image generation mapping data used here is overhead image generation mapping data for generating an overhead image from an image captured with a camera attached at the normal attachment angle (camera depression angle=$\theta$).

Consequently, the corresponding pixel position (Hb2, Vb2) of the object distance calculation image (overhead image) does not indicate the actual correct object distance.

The corresponding pixel position (Hb2, Vb2) of the object distance calculation image (overhead image) in FIG. 8(3) is located at the position of 4 m to the left side and 4 m to the depth side from the camera. This is different from the actual position of the vertical pole 81. That is, this is different from the position of 3 m to the left side and 3 m to the depth side from the camera described above with reference to FIG. 7. A distance measurement deviation of 1 m in width and 1 m in depth is generated.

This is because the camera is not attached correctly at the prespecified camera depression angle=$\theta$.

(2-(2)-(B2) Example of Processing of Calculating Object Distance by Using Image Captured with Camera with Camera Depression Angle ($\theta+\Delta\theta$) with Attachment Error (Example of Accurate Distance Calculation)]

Next, an example of processing of calculating an object distance by using an image captured with a camera with a camera depression angle ($\theta+\Delta\theta$) with an attachment error (example of accurate distance calculation) will be described.

A processing example, in which correct object distance calculation processing can be performed without generating a distance deviation even in a case where a camera is not attached correctly at the prespecified camera depression angle=$\theta$, will be described with reference to FIG. 9.

Figure 9:
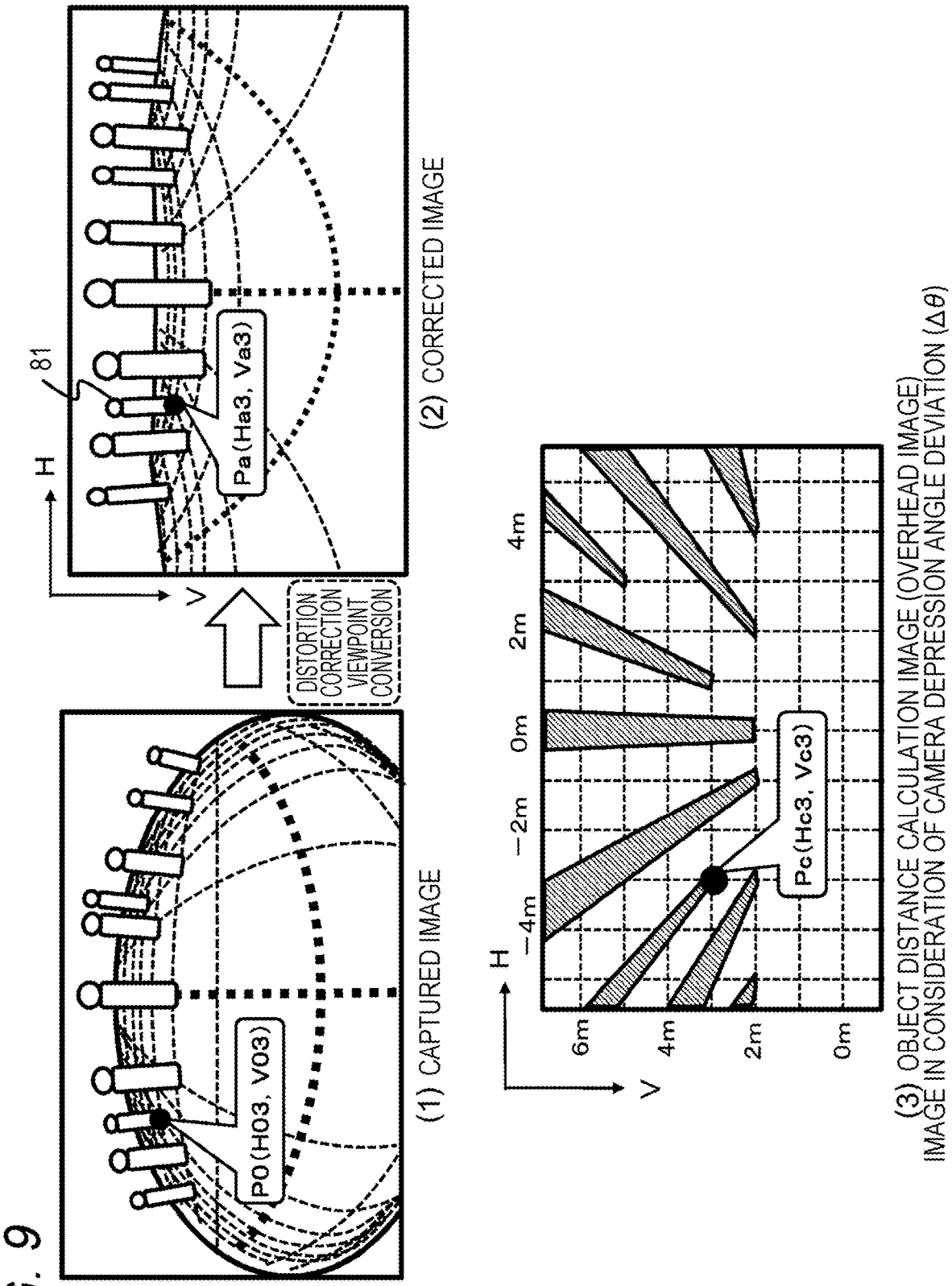
FIG. 9 illustrates an example of calculating an accurate object distance by using an image captured with a camera attached with the camera depression angle deviation (Δθ).

In a manner similar to that in FIG. 8, FIG. 9 illustrates a processing example in a case where a camera is not attached correctly at the prespecified camera depression angle=$\theta$, that is, in a case where an image captured with a camera attached with the camera depression angle deviation ($\Delta\theta$) is used.

In a manner similar to the captured image of FIG. 8(1), a (1) captured image in FIG. 9 is obtained by a camera attached with a camera depression angle deviation ($\Delta\theta$), which is different from a preset normal camera depression angle (angle formed by a virtual viewpoint direction and an optical axis), that is, the camera depression angle=$\theta$, that is a camera with the camera depression angle=$\theta+\Delta\theta$.

A FIG. 9(2) corrected image is similar to the corrected image of FIG. 8(2). That is, in contrast to the captured image of FIG. 9(1), the corrected image is generated by using the above-described corrected image generation mapping data, that is, corrected image generation mapping data, which has been generated for converting an image captured with a camera attached at a normal attachment angle.

The corrected image is obtained by conversion into a normal camera captured image (corrected image (converted image)) seen from a predetermined viewpoint direction (virtual viewpoint direction in FIG. 1).

The captured image in FIG. 9(1) is captured with a camera with the camera depression angle deviation ($\Delta\theta$), which is different from the normal camera depression angle=$\theta$, that is, the camera depression angle=$\theta+\Delta\theta$. Consequently, if the corrected image generation mapping data for an image captured with a camera at a normal attachment angle is used, correct conversion is not performed. As a result, vertical poles in the FIG. 9(2) corrected image are displayed such that the inclinations increase as the vertical poles separate from the center of the image in the right-and-left direction to right-and-left directions of the image.

FIG. 9(3) is an object distance calculation image. FIG. 9(3) is an overhead image observed from a position further above the attachment position of the camera 11 of the vehicle 10 in FIG. 1 to the diagonally downward direction in the rear of the vehicle. The overhead image is also generated by using overhead image generation mapping data for generating an overhead image from an image captured with a camera attached at the normal attachment angle (camera depression angle=$\theta$).

That is, the overhead image in FIG. 9(3) is generated in consideration of the deviation ($\Delta\theta$) of the camera depression angle.

If the object distance is calculated by using the three images, the correct object distance can be calculated.

That is, the correct object distance can be calculated by generating the object distance calculation image in FIG. 9(3) in consideration of the deviation ($\Delta\theta$) of the camera depression angle and calculating the object distance by using the image.

In a manner similar to those in FIGS. 7 and 8, an example of calculating a distance to one vertical pole 81 in the FIG. 9(2) corrected image will be described.

The pixel position of the intersection of one vertical pole 81 and a road surface in the FIG. 9(2) corrected image, that is, the pixel position in the corrected image is defined as (Ha3, Va3).

Coordinates (H03, V03) indicating the corresponding pixel position in the captured image can be determined with reference to the corrected image generation mapping data.

Moreover, a corresponding pixel position (Hb3, Vb3) of the object distance calculation image (overhead image) in FIG. 9(3) of the coordinates (H03, V03) indicating a pixel position in the captured image can be obtained with reference to overhead image generation mapping data. The mapping data is a map in which corresponding pixel positions of the captured image in FIG. 9(1) and the object distance calculation image (overhead image) in FIG. 9(3) are registered.

The overhead image generation mapping data used here is not overhead image generation mapping data for generating an overhead image from an image captured with a camera attached at the normal attachment angle (camera depression angle=$\theta$). The overhead image generation mapping data used here is overhead image generation mapping data in consideration of the camera depression angle deviation ($\Delta\theta$) of an actual camera that has captured the FIG. 9(1) captured image. That is, the overhead image generation mapping data used here is overhead image generation mapping data for generating an overhead image from an image captured with a camera attached at the camera depression angle=$\theta+\Delta\theta$.

The corresponding pixel positions of the captured image in FIG. 9(1) and the object distance calculation image (overhead image) in FIG. 9(3) are calculated by using the overhead image generation mapping data in consideration of the camera depression angle deviation ($\Delta\theta$) of the actual camera that has captured the FIG. 9(1) captured image to generate the object distance calculation image (overhead image) in FIG. 9(3).

As a result, the corresponding pixel position (Hb3, Vb3) of the coordinates (H03, V03) in the FIG. 9(1) captured image in the object distance calculation image (overhead image) in FIG. 9(3) indicates an actual correct object distance.

The corresponding pixel position (Hb3, Vb3) of the object distance calculation image (overhead image) in FIG. 9(3) indicates the position of 3 m to the left side and 3 m to the depth side from the camera. This corresponds to the actual position of the vertical pole 81. That is, this is the correct object distance that matches the position of 3 m to the left side and 3 m to the depth side from the camera described above with reference to FIG. 7.

In this way, the correct object distance can be calculated by generating the object distance calculation image in FIG. 9(3) in consideration of the deviation ($\Delta\theta$) of the camera depression angle and calculating the object distance by using the image.

[3. Configuration of Image Processing Apparatus of Present Disclosure and Image Processing Sequence]

Next, the configuration of an image processing apparatus of the present disclosure and an image processing sequence will be described.

First, the configuration of the image processing apparatus of the present disclosure will be described with reference to FIG. 10.

Figure 10:
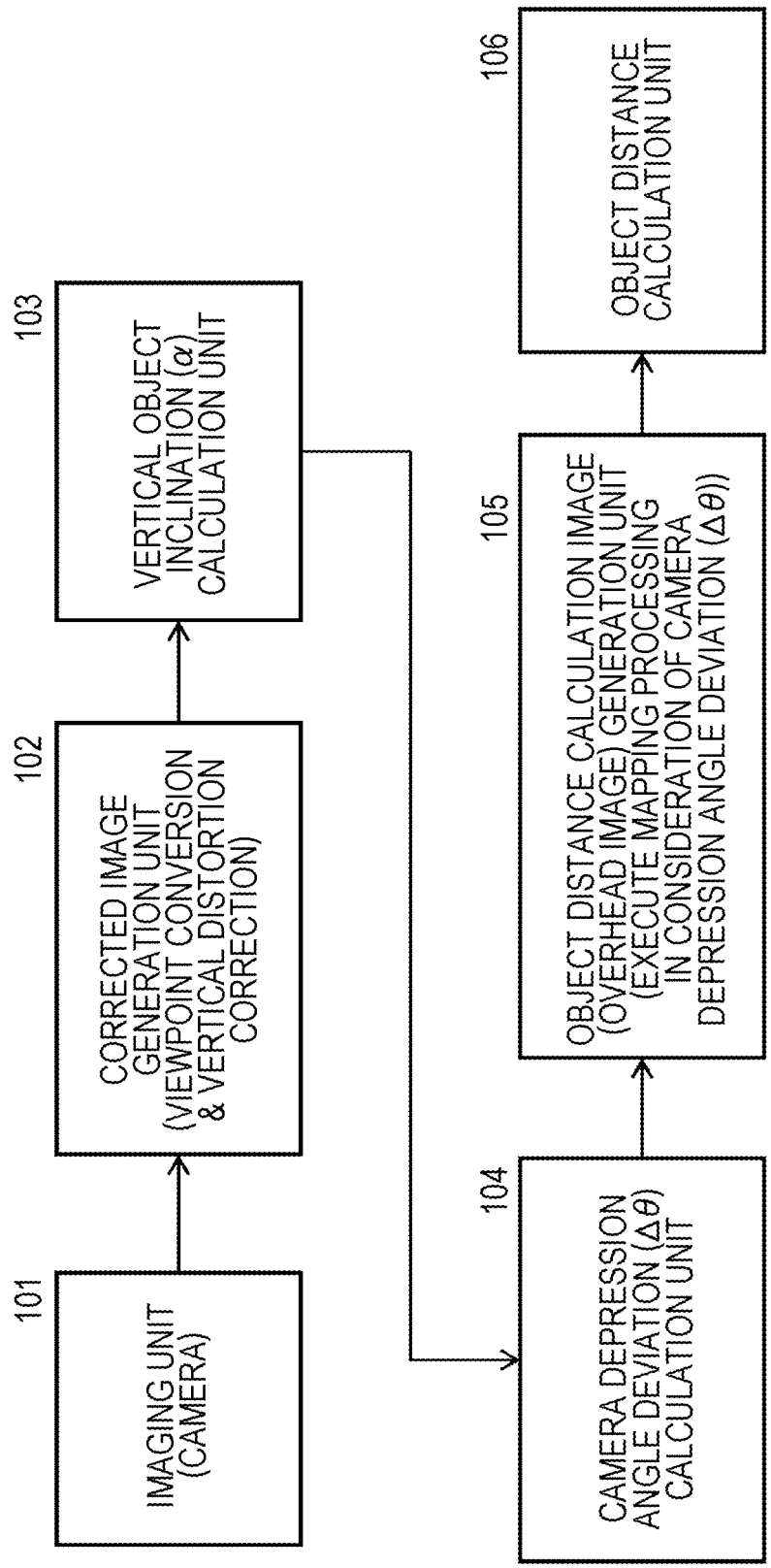
FIG. 10 illustrates a configuration example of the image processing apparatus of the present disclosure.

FIG. 10 is a block diagram illustrating one configuration example of an image processing apparatus 100 of the present disclosure.

As illustrated in FIG. 10, the image processing apparatus 100 of the present disclosure includes an imaging unit (camera) 101, a corrected image generation unit 102, a vertical object inclination calculation unit 103, a camera depression angle deviation calculation unit 104, an object distance calculation image generation unit 105, and an object distance calculation unit 106.

Note that it is not essential that the imaging unit (camera) 101 is a component of the image processing apparatus 100. The image processing apparatus 100 is not required to include the imaging unit (camera) 101. The image processing apparatus 100 may process an image input from the outside.

Hereinafter, processing executed by each component of the image processing apparatus 100 in FIG. 1 will be described.

The imaging unit (camera) 101 captures an image. The imaging unit (camera) 101 corresponds to the camera 11 mounted on the vehicle 10 in FIG. 1.

The imaging unit (camera) 101 is a camera including a wide-angle lens such as a fisheye lens.

A captured image of the imaging unit (camera) 101 is input to the corrected image generation unit 102.

The corrected image generation unit 102 performs correction processing on the captured image of the imaging unit (camera) 101 to generate a corrected image.

Specifically, a corrected image is generated by executing distortion correction and viewpoint conversion on the captured image of the imaging unit (camera) 101.

This is processing of generating the (2) corrected image from the (1) captured image described above with reference to FIGS. 7 to 9.

As described above, the image conversion processing of conversion from the (1) captured image to the (2) corrected image is performed by, for example, distortion correction, in which cylindrical projection is performed, and image conversion processing on the basis of the camera depression angle and camera lens distortion information. As specific processing, a corrected image is generated by mapping processing for corresponding pixel positions.

That is, the corrected image is generated by using mapping data (corrected image generation mapping data), which is corresponding pixel position registration data obtained by registering a pixel position P1 (H1, V1) of an image after conversion (corrected image) corresponding to a pixel position P0 (H0, V0) of an image before conversion (captured image).

Note that the corrected image generation mapping data used here is mapping data for a camera captured image of a camera that is set at the correct camera depression angle=$\theta$ and correctly attached as specified, and preliminarily stored in a storage unit of the image processing apparatus 100.

The viewpoint conversion is performed on a corrected image generated by the corrected image generation unit 102 such that a viewpoint direction corresponds to a direction parallel to a road surface, that is, the virtual viewpoint direction in FIG. 1. The corrected image is displayed on a monitor of a driver seat.

The corrected image generated by the corrected image generation unit 102 is input to the vertical object inclination calculation unit 103.

The vertical object inclination calculation unit 103 extracts a vertical object vertically standing on a road surface in the real world from the corrected image generated by the corrected image generation unit 102, and calculates the inclination ($\alpha$) of the vertical object.

Note that the vertical object vertically standing on a road surface in the real world can be selected from various subjects, for example, signs, signals, utility poles, other poles, and people on a road.

The vertical object inclination calculation unit 103 calculates the inclination ($\alpha$) of the vertical object in the corrected image generation unit 102.

As described above, in a case where an image captured with a camera with a camera depression angle of the specified angle ($\theta$) is converted by using corrected image generation mapping data for an image captured with a camera with the camera depression angle=$\theta$, the vertical object in the real world is vertically displayed in the corrected image.

In a case where an image captured with a camera with a camera depression angle=$\theta+\Delta\theta$, which is not the specified angle ($\theta$), is converted by using mapping data for an image captured with a camera with the camera depression angle=$\theta$, however, the vertical object in the real world is displayed in a more inclined manner as the vertical object separates from the center position of the image in the right-and-left direction to the right and left.

The vertical object inclination calculation unit 103 extracts a vertical object vertically standing on a road surface in the real world from the corrected image generated by the corrected image generation unit 102, and calculates the inclination ($\alpha$) of the vertical object.

The inclination ($\alpha$) of the vertical object calculated by the vertical object inclination calculation unit 103 is input to the camera depression angle deviation calculation unit 104.

The camera depression angle deviation calculation unit 104 calculates the deviation angle ($\Delta\theta$) from the reference angle ($\theta$) of the depression angle of the imaging unit (camera) 101 by using the inclination (α) of the vertical object calculated by the vertical object inclination calculation unit 103.

The camera depression angle deviation calculation unit 104 calculates the deviation angle (Δθ) of the camera depression angle of the imaging unit (camera) 101 in accordance with (Expression 3) below described above.

$$\Delta\theta = A \times \alpha \times h\,\text{max}/ha \qquad \text{(Expression 3)}$$

In (Expression 3) above, A represents the aspect ratio (vertical/horizontal) of a corrected image, h max represents the distance (image length or pixel number) from the center position of the corrected image in the right-and-left direction to a right or left image end, α represents the inclination of a vertical object, and ha represents the distance ha (image length or pixel number) from the center position of the corrected image in the right-and-left direction of the vertical object.

Note that, as described above, in a case where a plurality of (n) vertical objects is detected in a camera captured image, and individual inclinations (α1 to αn) are detected for the vertical objects (1 to n), processing of calculating n camera depression angle deviations (Δθ1 to Δθn) in accordance with (Expression 3) above on the basis of the inclinations (α1 to αn) for separate objects, calculating the average or the intermediate value of the n calculated value, and defining the calculated value as the camera depression angle deviation (Δθ) may be performed.

Note that, in a case where the imaging unit (camera) 101 is normally attached at the specified camera depression angle (θ), the camera depression angle deviation (Δθ) calculated by the camera depression angle deviation calculation unit 104 is 0, that is, Δθ=0 is established.

The camera depression angle deviation (Δθ) calculated by the camera depression angle deviation calculation unit 104 is input to the object distance calculation image (overhead image) generation unit 105.

The object distance calculation image (overhead image) generation unit 105 generates an object distance calculation image (overhead image) in consideration of the deviation angle (Δθ) of the camera depression angle calculated by the camera depression angle deviation calculation unit 104.

The processing corresponds to, for example, the processing of generating an object distance calculation image (overhead image) in FIG. 9(3) described above with reference to FIG. 9.

The object distance calculation image (overhead image) generation unit 105 generates an object distance calculation image (overhead image) by using the overhead image generation mapping data.

In the overhead image generation mapping data used here, the camera depression angle deviation (Δθ) of the imaging unit (camera) 101 is considered. That is, the overhead image generation mapping data used here is overhead image generation mapping data for generating an overhead image from an image captured with a camera attached at the camera depression angle=θ+Δθ.

Note that, in a case where the camera depression angle deviation Δθ=0 is calculated by the camera depression angle deviation calculation unit 104, that is, the imaging unit (camera) 101 is normally attached at the specified camera depression angle (θ), the deviation angle of the camera depression angle input from the camera depression angle deviation calculation unit 104: Δθ=0 is established.

In the case, the object distance calculation image (overhead image) generation unit 105 generates an object distance calculation image (overhead image) by using overhead image generation mapping data for generating an overhead image from an image captured with a camera attached at the normal attachment angle (camera depression angle=θ).

The object distance calculation image (overhead image) corresponds to the object distance calculation image (overhead image) described above with reference to FIG. 7(3).

Note that the overhead image generation mapping data is preliminarily stored in the storage unit of the image processing apparatus 100. For example, a plurality of pieces of data corresponding to the camera depression angle deviation Δθ in a predetermined range is stored. Specifically, for example, a plurality of pieces of mapping data in the range of Δθ=−5°+5° is stored in the storage unit.

Alternatively, a configuration in which the storage unit stores only one piece of Δθ=0 mapping data and a parameter for converting the mapping data into mapping data in the range of Δθ=−5°+5° may be adopted.

In the way, the object distance calculation image (overhead image) generation unit 105 selectively executes any of the following two types of processing.

(Processing 1) In a case where the camera depression angle deviation calculated by the camera depression angle deviation calculation unit 104 Δθ=0 is established, an object distance calculation image (overhead image) is generated by using overhead image generation mapping data for generating an overhead image from an image captured with a camera attached at the normal attachment angle (camera depression angle=θ).

(Processing 2) In a case where the camera depression angle deviation calculated by the camera depression angle deviation calculation unit 104 Δθ≠0 is established, an object distance calculation image (overhead image) is generated by using overhead image generation mapping data in consideration of the camera depression angle deviation (Δθ) of the imaging unit (camera) 101.

(Processing 1) above corresponds to the processing described above with reference to FIG. 7, and (Processing 2) corresponds to the processing described with reference to FIG. 9.

The object distance calculation image (overhead image) generated by the object distance calculation image (overhead image) generation unit 105 is input to the object distance calculation unit 106.

The object distance calculation unit 106 calculates the distances of various subjects (objects) included in an image captured with the imaging unit (camera) 101 by using the object distance calculation image (overhead image) generated by the object distance calculation image (overhead image) generation unit 105.

As described above with reference to, for example, FIG. 7, the object distance calculation image (overhead image) is a converted image obtained by equally scaling the road surface, so that coordinates indicating a position in the real world can be determined from the pixel position of the object distance calculation image (overhead image). The distance from the camera (=vehicle), that is, the subject distance (object distance) can be calculated from the coordinates indicating a position in the real world.

Next, image processing executed by the image processing apparatus 100 of the present disclosure, specifically, a calculation sequence of a subject distance based on a camera captured image will be described with reference to the flowchart in FIG. 11.

Figure 11:
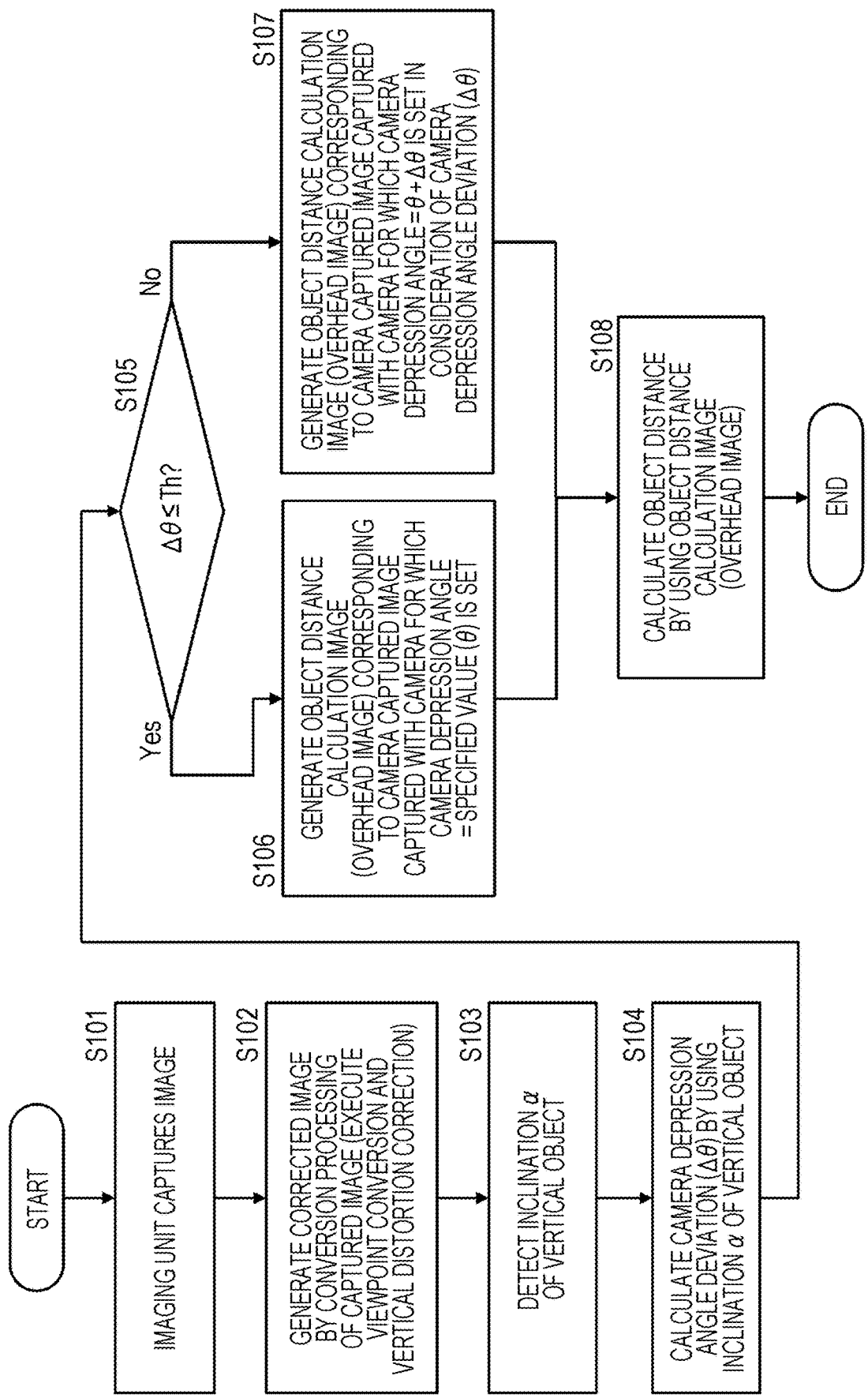
FIG. 11 is a flowchart illustrating a processing sequence executed by the image processing apparatus of the present disclosure.

Note that the processing in accordance with the flowchart in FIG. 11 can be executed under the control of a data processing unit including, for example, a CPU having a program execution function in accordance with a program stored in the storage unit of the image processing apparatus.

The processing of each step of the flow in FIG. 11 will be sequentially described below.

(Step S101)

First, in Step S101, the imaging unit (camera) 101 captures an image. The imaging unit (camera) 101 corresponding to the camera 11 mounted on the vehicle 10 in FIG. 1 captures an image.

Note that the imaging unit (camera) 101 is a camera including a wide-angle lens such as a fisheye lens, and captures images in FIGS. 7(1) and 9(1), for example.

(Step S102)

Next, in Step S102, image conversion processing (correction processing) is executed on the image captured by the imaging unit (camera) 101 in Step S101 to generate a corrected image.

The corrected image generation unit 102 in FIG. 10 executes the processing.

The corrected image generation unit 102 generates a corrected image obtained by executing distortion correction and viewpoint conversion on the captured image of the imaging unit (camera) 101. Specifically, the corrected image is generated by using mapping data (corrected image generation mapping data), which is corresponding pixel position registration data obtained by registering a pixel position P1 (H1, V1) of an image after conversion (corrected image) corresponding to a pixel position P0 (H0, V0) of an image before conversion (captured image).

Note that the corrected image generation mapping data used here is mapping data for a camera captured image of a camera that is set at the correct camera depression angle=θ and correctly attached as specified.

The corrected image generated in Step S102 is obtained by performing viewpoint conversion such that a viewpoint direction corresponds to a direction parallel to a road surface, that is, the virtual viewpoint direction in FIG. 1. The corrected image is displayed on a monitor of a driver seat.

(Step S103)

Next, in Step S103, a vertical object vertically standing on a road surface in the real world is extracted from the corrected image generated in S102, and the inclination (α) of the vertical object is calculated. The vertical object can be selected from various subjects, for example, signs, signals, utility poles, other poles, and people on a road.

As described above, in a case where an image captured with a camera with a camera depression angle of the specified angle (θ) is converted by using corrected image generation mapping data for an image captured with a camera with the camera depression angle=θ, the vertical object in the real world is vertically displayed in the corrected image.

In a case where an image captured with a camera with a camera depression angle=θ+Δθ, which is not the specified angle (θ), is converted by using mapping data for an image captured with a camera with the camera depression angle=θ, however, the vertical object in the real world is displayed in a more inclined manner as the vertical object separates from the center position of the image in the right-and-left direction to the right and left.

In Step S103, the vertical object inclination calculation unit 103 extracts a vertical object vertically standing on a road surface in the real world from the corrected image generated by the corrected image generation unit 102, and calculates the inclination (α) of the vertical object.

(Step S104)

Next, in Step S104, the deviation angle (Δθ) is calculated from the reference angle (θ) of the depression angle of the imaging unit (camera) 101 by using the inclination (α) of the vertical object detected in Step S103.

The camera depression angle deviation calculation unit 104 in FIG. 10 executes the processing.

The camera depression angle deviation calculation unit 104 calculates the deviation angle (Δθ) of the camera depression angle of the imaging unit (camera) 101 in accordance with (Expression 3) below described above.

$$\Delta\theta = A \times \alpha \times h\,\text{max}/ha \qquad \text{(Expression 3)}$$

In (Expression 3) above, A represents the aspect ratio (vertical/horizontal) of a corrected image, h max represents the distance (image length or pixel number) from the center position of the corrected image in the right-and-left direction to a right or left image end, a represents the inclination of a vertical object, and ha represents the distance ha (image length or pixel number) from the center position of the corrected image in the right-and-left direction of the vertical object.

Note that, as described above, in a case where a plurality of (n) vertical objects is detected in a camera captured image, and individual inclinations (α1 to an) are detected for the vertical objects (1 to n), processing of calculating n camera depression angle deviations (Δθ1 to Δθn) in accordance with (Expression 3) above on the basis of the inclinations (α1 to an) for separate objects, calculating the average or the intermediate value of the n calculated value, and defining the calculated value as the camera depression angle deviation (Δθ) may be performed.

Note that, in a case where the imaging unit (camera) 101 is normally attached at the specified camera depression angle (θ), the camera depression angle deviation (Δθ) calculated by the camera depression angle deviation calculation unit 104 is 0, that is, Δθ=0 is established.

(Step S105)

The object distance calculation image (overhead image) generation unit 105 in FIG. 10 executes the processing of Steps S105 to S107.

The object distance calculation image (overhead image) generation unit 105 generates an object distance calculation image (overhead image) in consideration of the deviation angle (Δθ) of the camera depression angle calculated by the camera depression angle deviation calculation unit 104.

First, in Step S105, the object distance calculation image (overhead image) generation unit 105 determines whether or not the camera depression angle deviation Δθ calculated by the camera depression angle deviation calculation unit 104 in Step S104 is equal to or less than a prespecified threshold Th.

If the camera depression angle deviation Δθ is determined to be equal to or less than the prespecified threshold Th, the processing proceeds to Step S106.

In contrast, if the camera depression angle deviation Δθ is determined not to be equal to or less than the prespecified threshold Th, the processing proceeds to Step S107.

(Step S106)

If the camera depression angle deviation Δθ is determined to be equal to or less than the prespecified threshold Th in Step S105, the processing of Step S106 is executed.

The fact that the camera depression angle deviation Δθ is equal to or less than the prespecified threshold Th means that the imaging unit (camera) 101 is attached at a substantially normal attachment angle (camera depression angle=θ).

In the case, in Step S106, an object distance calculation image (overhead image) is generated by using overhead image generation mapping data for generating an overhead image from an image captured with a camera attached at the normal attachment angle (camera depression angle=θ).

The processing corresponds to the processing of generating an object distance calculation image (overhead image) in FIG. 7(3) described above with reference to FIG. 7.

(Step S107)

In contrast, if the camera depression angle deviation Δθ is determined not to be equal to or less than the prespecified threshold Th in Step S105, the processing of Step S107 is executed.

The fact that the camera depression angle deviation Δθ is not equal to or less than the prespecified threshold Th means that the imaging unit (camera) 101 is not attached at a substantially normal attachment angle (camera depression angle=θ).

The camera depression angle of the imaging unit (camera) 101 has a deviation (Δθ), and the camera depression angle=θ+Δθ is established.

In the case, in Step S107, the object distance calculation image (overhead image) is generated by using overhead image generation mapping data in consideration of the camera depression angle deviation (Δθ) of the imaging unit (camera) 101.

The processing corresponds to the processing of generating an object distance calculation image (overhead image) in FIG. 9(3) described above with reference to FIG. 9.

(Step S108)

Finally, in Step S108, a subject distance (object distance) is calculated by using the object distance calculation image (overhead image) generated by the object distance calculation image (overhead image) generation unit 105 in Steps S106 and S107.

The object distance calculation unit 106 in FIG. 10 executes the processing.

In Step S108, the object distance calculation unit 106 calculates the distances of various subjects (objects) included in an image captured with the imaging unit (camera) 101 by using the object distance calculation image (overhead image) generated by the object distance calculation image (overhead image) generation unit 105 in Steps S106 and S107.

As described above, the object distance calculation image (overhead image) is a converted image obtained by equally scaling the road surface, so that coordinates indicating a position in the real world can be determined from the pixel position of the object distance calculation image (overhead image). The distance from the camera (=vehicle body), that is, the subject distance (object distance) can be calculated from the coordinates indicating a position in the real world.

As described above, the image processing apparatus of the present disclosure can accurately calculate the distance (object distance) to a subject in both cases of an image captured with a camera with a normal attachment angle and an image captured with a camera with an abnormal attachment angle.

[4. Hardware Configuration Example of Image Processing Apparatus of Present Disclosure]

Next, a hardware configuration example of the image processing apparatus 100 described in the above-described embodiment will be described with reference to FIG. 12.

Figure 12:
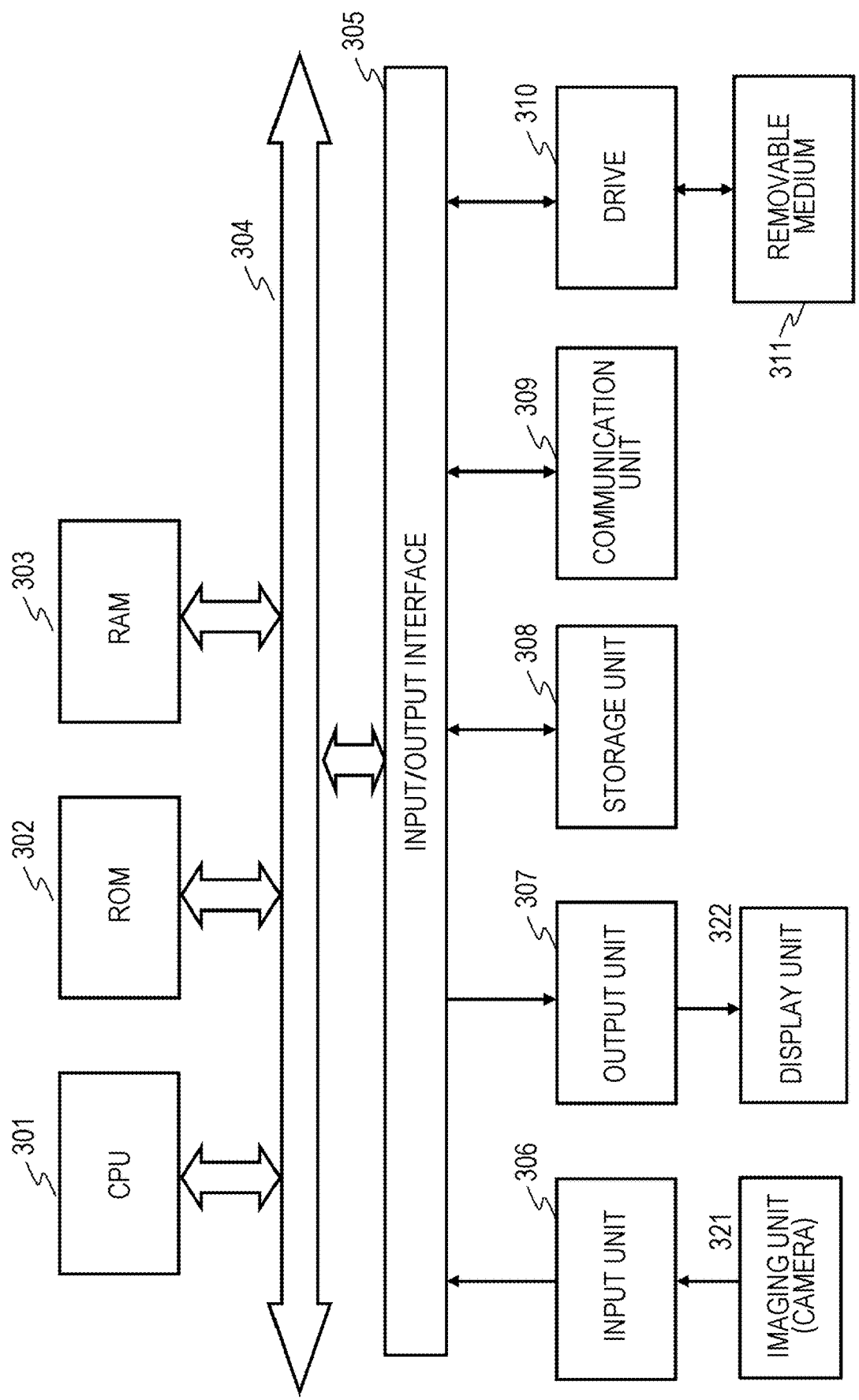
FIG. 12 illustrates a hardware configuration example of the image processing apparatus.

FIG. 12 illustrates the hardware configuration example of the image processing apparatus that executes the processing of the present disclosure.

A central processing unit (CPU) 301 functions as a control unit and a data processing unit that execute various pieces of processing in accordance with a program stored in a read only memory (ROM) 302 or a storage unit 308. For example, processing is performed in accordance with the sequence described in the above-described embodiment. For example, a program to be executed by the CPU 301 and data are stored in a random access memory (RAM) 303. These CPU 301, ROM 302, and RAM 303 are mutually connected by a bus 304.

The CPU 301 is connected to an input/output interface 305 via the bus 304. An input unit 306 and an output unit 307 are connected to the input/output interface 305. The input unit 306 inputs a captured image of an imaging unit 321, and includes, for example, various switches, a keyboard, a mouse, and a microphone that enable user input. The output unit 307 outputs data to a display unit 322, a speaker, and the like. The CPU 301 executes various pieces of processing in accordance with a command input from the input unit 306, and outputs the processing result to, for example, the output unit 307.

The storage unit 308 connected to the input/output interface 305 includes, for example, a hard disk, and stores a program to be executed by the CPU 301 and various pieces of data. A communication unit 309 functions as a transmission/reception unit in Wi-Fi communication, Bluetooth (registered trademark) (BT) communication, and other data communications via a network such as the Internet and a local area network, and communicates with an external apparatus.

A drive 310 connected to the input/output interface 305 drives a removable medium 311 including a magnetic disk, an optical disk, a magneto-optical disk, and a semiconductor memory such as a memory card. The drive 310 records or reads data.

[5. Summary of Configuration of Present Disclosure]

The embodiment of the present disclosure has been described in detail above with reference to the specific embodiment. It is, however, obvious that those skilled in the art can modify or substitute the embodiment without departing from the gist of the present disclosure. That is, the present invention has been disclosed in the form of exemplification, and should not be limitedly interpreted. The claims should be considered in order to determine the gist of the present disclosure.

Note that the technology disclosed in the specification can have configurations as follows.

(1) An image processing apparatus including:
 a corrected image generation unit that performs distortion correction by inputting an image captured with a camera having a wide-angle lens and generates a corrected image;
 a vertical object inclination calculation unit that calculates an inclination of a vertical object in a real world in the corrected image;
 a camera depression angle deviation calculation unit that calculates a deviation angle of a camera depression angle of the camera on the basis of the inclination of the vertical object;
 an object distance calculation image generation unit that generates an object distance calculation image in consideration of a camera depression angle deviation angle of the camera; and
 an object distance calculation unit that calculates a distance of an object included in the image captured with the camera with reference to the object distance calculation image.

(2) The image processing apparatus according to (1),
 in which the corrected image generation unit generates the corrected image by using corrected image generation mapping data in which a pixel position is mapped, the mapping data being used for converting an image captured with a camera having a specified camera depression angle into an image from a prespecified viewpoint direction.

(3) The image processing apparatus according to (1) or (2), in which the camera depression angle deviation calculation unit calculates a deviation angle from a specified angle of a camera depression angle, which is formed by an optical-axis direction of the camera and a viewpoint direction of the corrected image.

(4) The image processing apparatus according to any one of (1) to (3), in which the camera depression angle deviation calculation unit calculates a deviation angle $\Delta\theta$ of a camera depression angle of the camera $$\Delta\theta = A \times \alpha \times h\, max/ha$$

in accordance with an expression above by using values of:

an aspect ratio (vertical/horizontal) A of the corrected image;

a distance h max from a center position of the corrected image in a right-and-left direction to a right or left image end; and an inclination $\alpha$ of a vertical object an optional distance ha away from the center position of the corrected image in the right-and-left direction.

(5) The image processing apparatus according to any one of (1) to (4), in which the camera depression angle deviation calculation unit calculates n camera depression angle deviations ($\Delta\theta 1$ to $\Delta\theta n$) on the basis of a plurality of inclinations ($\alpha 1$ to $\alpha n$) corresponding to a plurality of (n) vertical objects in an image captured with the camera, and calculates an average or an intermediate value of the calculated n camera depression angle deviations ($\Delta\theta 1$ to $\Delta\theta n$) as a final camera depression angle deviation ($\Delta\theta$).

(6) The image processing apparatus according to any one of (1) to (5), in which the object distance calculation image generation unit generates an overhead image reflecting a position in a real world as an object distance calculation image.

(7) The image processing apparatus according to any one of (1) to (6), in which, in a case where the camera depression angle deviation angle of the camera is equal to or less than a specified threshold, the object distance calculation image generation unit generates the object distance calculation image by using overhead image generation mapping data for generating an overhead image from an image captured with a camera attached at a normal attachment angle.

(8) The image processing apparatus according to any one of (1) to (7), in which, in a case where the camera depression angle deviation angle of the camera is not equal to or less than a specified threshold, the object distance calculation image generation unit generates the object distance calculation image by using overhead image generation mapping data in consideration of the camera depression angle deviation of the camera.

(9) An image processing method executed in an image processing apparatus, including the steps of:

a corrected image generation unit performing distortion correction by inputting an image captured with a camera having a wide-angle lens and generating a corrected image;

a vertical object inclination calculation unit calculating an inclination of a vertical object in a real world in the corrected image;

a camera depression angle deviation calculation unit calculating a deviation angle of a camera depression angle of the camera on the basis of the inclination of the vertical object;

an object distance calculation image generation unit generating an object distance calculation image in consideration of a camera depression angle deviation angle of the camera; and an object distance calculation unit calculating a distance of an object included in the image captured with the camera with reference to the object distance calculation image.

(10) A program causing image processing to be executed in an image processing apparatus, the program causing:

a corrected image generation unit to perform distortion correction by inputting an image captured with a camera having a wide-angle lens and generate a corrected image;

a vertical object inclination calculation unit to calculate an inclination of a vertical object in a real world in the corrected image;

a camera depression angle deviation calculation unit to calculate a deviation angle of a camera depression angle of the camera on the basis of the inclination of the vertical object;

an object distance calculation image generation unit to generate an object distance calculation image in consideration of a camera depression angle deviation angle of the camera; and an object distance calculation unit to calculate a distance of an object included in the image captured with the camera with reference to the object distance calculation image.

Furthermore, a series of processing described in the specification can be executed by hardware, software, or a combined configuration of both. In a case where the processing is executed by software, a program, in which a processing sequence is recorded, can be executed by being installed in a memory in a computer incorporated in dedicated hardware or being installed in a general-purpose computer capable of executing various pieces of processing. For example, a program can be preliminarily recorded in a recording medium. In addition to being installed in a computer from a recording medium, a program can be received via a network such as a local area network (LAN) and the Internet, and installed in a recording medium such as a built-in hard disk.

Note that the various pieces of processing described in the specification may be not only executed in chronological order in accordance with the description, but executed in parallel or individually in accordance with the processing capability or needs of an apparatus that executes processing. Furthermore, a system in the specification has configuration of a logical set of a plurality of apparatuses. The system is not limited to a system in which apparatuses having each configuration are placed in the same housing.

INDUSTRIAL APPLICABILITY

As described above, according to the configuration of one embodiment of the present disclosure, an accurate subject distance can be calculated on the basis of a camera captured image even in a case where the attachment angle of a camera is deviated.

Specifically, for example, an image captured with a camera having a wide-angle lens is input to perform distortion correction and generate a corrected image. Moreover, the inclination of a vertical object in the real world in the corrected image is calculated. The deviation angle of the camera depression angle of the camera is calculated on the basis of the inclination of the vertical object. An object distance calculation image is generated in consideration of the camera depression angle deviation angle. The distance of an object included in the camera captured image is calculated from the object distance calculation image. In a case where the camera depression angle deviation angle is not equal to or less than a prespecified threshold, the object distance calculation image is generated by using overhead image generation mapping data in consideration of the camera depression angle deviation.

The configurations allow calculation of an accurate subject distance based on a camera captured image even in a case where the camera attachment angle is deviated.

REFERENCE SIGNS LIST

10 Vehicle
11 Camera
20 Road surface
30 Vertical pole
40 Person
81 Vertical pole
100 Image processing apparatus
101 Imaging unit (camera)
102 Corrected image generation unit
103 Vertical object inclination calculation unit
104 Camera depression angle deviation calculation unit
105 Object distance calculation image generation unit
106 Object distance calculation unit
301 CPU
302 ROM
303 RAM
304 Bus
305 Input/output interface
306 Input unit
307 Output unit
308 Storage unit
309 Communication unit
310 Drive
311 Removable medium
321 Imaging unit
322 Display unit

The invention claimed is:

1. An image processing apparatus comprising:
processing circuitry configured to:
perform distortion correction by inputting an image captured with a camera having a wide-angle lens and generate a corrected image;
calculate an inclination of a vertical object in a real world in the corrected image;
calculate a deviation angle of a camera depression angle of the camera on a basis of the inclination of the vertical object;
generate an object distance calculation image in consideration of a camera depression angle deviation angle of the camera; and
calculate a distance of an object included in the image captured with the camera with reference to the object distance calculation image, wherein the deviation angle $\Delta\theta$ of the camera depression angle of the camera is calculated according to $$\Delta\theta = A \times \alpha \times h\ \text{max}/ha$$

wherein A is an aspect ratio (vertical/horizontal) of the corrected image;
h max is a distance from a center position of the corrected image in a right-and-left direction to a right or left image end;
ha is a distance from the center position of the corrected image in the right-and-left direction to a vertical object; and
$\alpha$ is an inclination of the vertical object at the distance ha away from the center position of the corrected image in the right-and-left direction.

2. The image processing apparatus according to claim 1, wherein the processing circuitry is configured to generate the corrected image by using corrected image generation mapping data in which a pixel position is mapped, the mapping data being used for converting an image captured with a camera having a specified camera depression angle into an image from a prespecified viewpoint direction.

3. The image processing apparatus according to claim 1, wherein the processing circuitry is configured to calculate a deviation angle from a specified angle of a camera depression angle, which is formed by an optical-axis direction of the camera and a viewpoint direction of the corrected image.

4. The image processing apparatus according to claim 1, wherein the processing circuitry is configured to calculate n camera depression angle deviations ($\Delta\theta1$ to $\Delta\theta n$) on a basis of a plurality of inclinations (al to an) corresponding to a plurality of (n) vertical objects in an image captured with the camera, and to calculate an average or an intermediate value of the calculated n camera depression angle deviations ($\Delta\theta1$ to $\Delta\theta n$) as a final camera depression angle deviation ($\Delta\theta$).

5. The image processing apparatus according to claim 1, wherein the processing circuitry is configured to generate an overhead image reflecting a position in a real world as an object distance calculation image.

6. An image processing apparatus comprising:
processing circuitry configured to:
perform distortion correction by inputting an image captured with a camera having a wide-angle lens and generate a corrected image;
calculate an inclination of a vertical object in a real world in the corrected image;
calculate a deviation angle of a camera depression angle of the camera on a basis of the inclination of the vertical object;
generate an object distance calculation image in consideration of a camera depression angle deviation angle of the camera; and
calculate a distance of an object included in the image captured with the camera with reference to the object distance calculation image,
wherein, in a case where the camera depression angle deviation angle of the camera is equal to or less than a specified threshold, the processing circuitry generates the object distance calculation image by using overhead image generation mapping data for generating an overhead image from an image captured with a camera attached at a normal attachment angle.

7. An image processing apparatus comprising:
processing circuitry configured to:
perform distortion correction by inputting an image captured with a camera having a wide-angle lens and generate a corrected image;
calculate an inclination of a vertical object in a real world in the corrected image;
calculate a deviation angle of a camera depression angle of the camera on a basis of the inclination of the vertical object;
generate an object distance calculation image in consideration of a camera depression angle deviation angle of the camera; and
calculate a distance of an object included in the image captured with the camera with reference to the object distance calculation image,
wherein, in a case where the camera depression angle deviation angle of the camera is not equal to or less than a specified threshold, the processing circuitry generates the object distance calculation image by using overhead image generation mapping data in consideration of the camera depression angle deviation of the camera.

8. An image processing method executed by processing circuitry in an image processing apparatus, comprising:
performing distortion correction by inputting an image captured with a camera having a wide-angle lens and generating a corrected image;
calculating an inclination of a vertical object in a real world in the corrected image;
calculating a deviation angle of a camera depression angle of the camera on a basis of the inclination of the vertical object;
generating an object distance calculation image in consideration of a camera depression angle deviation angle of the camera; and
calculating a distance of an object included in the image captured with the camera with reference to the object distance calculation image, wherein the deviation angle $\Delta\theta$ of the camera depression angle of the camera is calculated according to $$\Delta\theta = A \times \alpha \times h \text{ max}/ha$$

wherein A is an aspect ratio (vertical/horizontal) of the corrected image;

h max is a distance from a center position of the corrected image in a right-and-left direction to a right or left image end;
ha is a distance from the center position of the corrected image in the right-and-left direction to a vertical object; and
$\alpha$ is an inclination of the vertical object at the distance ha away from the center position of the corrected image in the right-and-left direction.

9. A non-transitory computer readable medium storing instructions that, when executed by processing circuitry, perform an image processing method comprising:
performing distortion correction by inputting an image captured with a camera having a wide-angle lens and generating a corrected image;
calculating an inclination of a vertical object in a real world in the corrected image;
calculating a deviation angle of a camera depression angle of the camera on a basis of the inclination of the vertical object;
generating an object distance calculation image in consideration of a camera depression angle deviation angle of the camera; and
calculating a distance of an object included in the image captured with the camera with reference to the object distance calculation image, wherein the deviation angle $\Delta\theta$ of the camera depression angle of the camera is calculated according to $$\Delta\theta = A \times \alpha \times h \text{ max}/ha$$

wherein A is an aspect ratio (vertical/horizontal) of the corrected image;
h max is a distance from a center position of the corrected image in a right-and-left direction to a right or left image end;
ha is a distance from the center position of the corrected image in the right-and-left direction to a vertical object; and
$\alpha$ is an inclination of the vertical object at the distance ha away from the center position of the corrected image in the right-and-left direction.

* * * * *